United States Patent [19]

Hashimoto et al.

[11] Patent Number: 4,914,519

[45] Date of Patent: Apr. 3, 1990

[54] APPARATUS FOR ELIMINATING NOISE IN A SOLID-STATE IMAGE PICKUP DEVICE

[75] Inventors: Seiji Hashimoto, Yokohama; Tsuneo Suzuki, Hiratsuka; Hayao Ohzu, Fuchu; Tadanori Harada, Hiratsuka, all of Japan

[73] Assignee: Canon Kabushiki Kaisha, Tokyo, Japan

[21] Appl. No.: 96,534

[22] Filed: Sep. 14, 1987

[30] Foreign Application Priority Data

Sep. 19, 1986 [JP] Japan ................................ 61-219666
Sep. 20, 1986 [JP] Japan ................................ 61-229625
Dec. 16, 1986 [JP] Japan ................................ 61-300802
Dec. 16, 1986 [JP] Japan ................................ 61-300803

[51] Int. Cl.$^4$ ............................................. H04N 5/232
[52] U.S. Cl. ............................ 358/213.18; 358/213.15
[58] Field of Search ...................... 358/213.15, 213.18, 358/213.16

[56] References Cited

U.S. PATENT DOCUMENTS

| | | | |
|---|---|---|---|
| 3,904,818 | 9/1975 | Kovac | 178/7.1 |
| 4,145,721 | 3/1979 | Beaudouin et al. | 358/213.15 |
| 4,293,877 | 10/1981 | Tsunekawa et al. | 358/213 |
| 4,380,755 | 4/1983 | Endlicher et al. | 382/68 |
| 4,392,157 | 7/1983 | Garcia et al. | 358/213.18 |
| 4,518,863 | 5/1985 | Fukuoka et al. | 358/213.12 |
| 4,686,554 | 8/1987 | Ohmi et al. | 357/30 |
| 4,742,392 | 5/1988 | Hashimoto | 358/172 |

FOREIGN PATENT DOCUMENTS

| | | |
|---|---|---|
| 59-15167 | 5/1984 | Japan. |
| 60-12759 | 1/1985 | Japan. |
| 60-12760 | 1/1985 | Japan. |
| 60-12761 | 1/1985 | Japan. |
| 60-12762 | 1/1985 | Japan. |
| 60-12763 | 1/1985 | Japan. |
| 60-12764 | 1/1985 | Japan. |
| 60-12765 | 1/1985 | Japan. |

*Primary Examiner*—James J. Groody
*Assistant Examiner*—Robert M. Bauer
*Attorney, Agent, or Firm*—Fitzpatrick, Cella, Harper & Scinto

[57] ABSTRACT

A solid state image pickup apparatus having a selector for selecting a plurality of sensor outputs through predetermined circuits includes a difference processing circuit for calculating a difference between a selected sensor signal and a reference signal selected through the same predetermined circuit as that of the selected sensor signal. The difference processing circuit includes a first holding circuit for holding the sensor signal, a second holding circuit for holding the selected reference signal, and a circuit for receiving the output signals from the first and second holding circuits and outputting a signal corresponding to a difference therebetween.

27 Claims, 20 Drawing Sheets

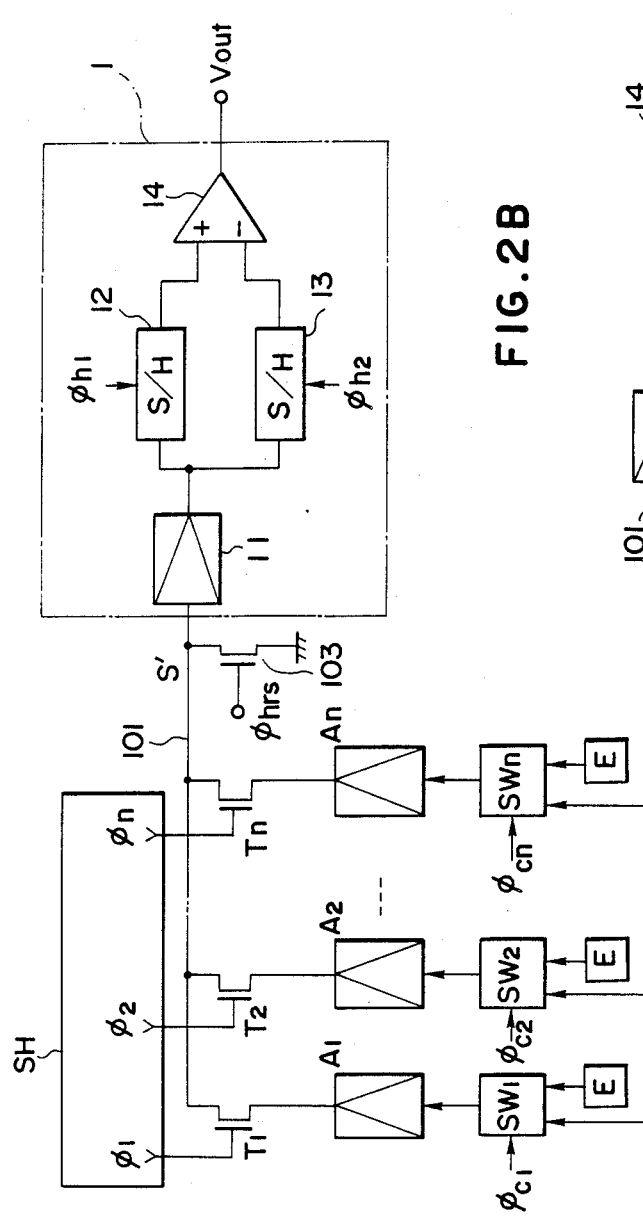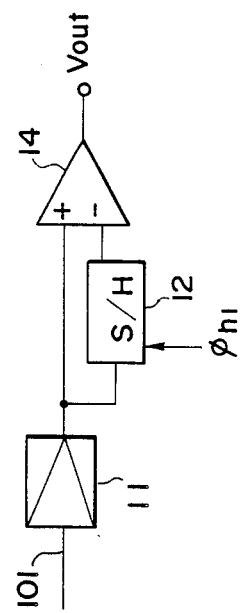
FIG.2A
FIG.2B

APPARATUS FOR ELIMINATING NOISE IN A SOLID-STATE IMAGE PICKUP DEVICE

BACKGROUND OF THE INVENTION

1. Field of the Invention

The present invention relates to a solid state image pickup apparatus for selectively reading out a plurality of sensor signals and, more particularly, to a solid state image pickup apparatus capable of eliminating unnecessary components such as variations in dark signals and drive noise.

2. Related Background Art

FIG. 1A is a schematic circuit diagram of a conventional solid-state image pickup apparatus.

Referring to FIG. 1A, signals from sensors S1 to Sn are respectively amplified by amplifiers A1 and An, and transistors T1 to Tn are sequentially turned on. A dot sequential output appears on an output line 101. The dot sequential signal is amplified by a buffer amplifier 102, and the resultant signal appears as an output signal Vout.

In the conventional image pickup apparatus described above, variations in input/output characteristics of the amplifiers A1 to An are included in the sensor signals as the dot sequential output appearing on the output line 101. As a result, steady pattern noise occurs.

FIG. 1B shows a schematic arrangement of another conventional photoelectric transducer apparatus.

Referring to FIG. 1B, signals read out from photosensors S1 to Sn are temporarily stored in storage capacitors C1 to Cn. Transistors T1 to Tn are sequentially turned on at timings of a scanning circuit SH, and the readout signals sequentially appear on an output line 101 and are output to an external device through an amplifier 102.

In the above photoelectric transducer apparatus, however, unnecessary components such as dark signals and drive noise of the photosensors are undesirably included.

Drive noise is defined as noise generated when a photosensor is driven to read out a signal. The drive noise components are noise caused by manufacture variations such as element shapes and smear caused by element isolation and depending on radiation amounts.

The dark signal is defined as a dark current of a photosensor and greatly depends on accumulation time and temperature of the photosensor.

This drive noise will be described in detail. Variations in drive capacity of a drive element for driving a photoelectric transducer element and variations in capacity of a photoelectric transducer element cause variations in the leakage component of drive pulses. These variation components, as an information signal, are superposed on a necessary photoelectric transducer signal and are read out. The cause of generation of drive noise will be described below.

FIG. 1C is a schematic view of a photoelectric transducer element described in Japanese Patent Laid-Open Gazette No. 12764/1985, FIG. 1D is a timing chart of drive pulses for driving the photoelectric transducer element shown in FIG. 1C, and FIG. 1E is a chart showing the base potential of the photoelectric transducer element.

Referring to FIG. 1C, the photoelectric transducer element includes a base accumulation type bipolar transistor B, a drive capacitor Cox for reverse- or forward-biasing the transistor B in response to a drive pulse $\phi r$, and a refresh transistor Qr. The transistor B has junction capacitances Cbc and Cbe. It should be noted that Cox, Cbc, and Cbe are referred to as capacitances or capacitors hereinafter, as needed. The capacitances Cox, Cbc, and Cbe are added to obtain a charge storage capacitance Ctot.

The operation of the photoelectric transducer element will be described below.

Assume that the initial value of a base potential VB is given as V0. When the drive pulse $\phi r$ is set at a potential $V\phi r$ at time t1, a voltage Va is applied to the base of the transistor B through the drive capacitor Cox. In this case, the voltage Va can be represented as follows:

$$Va = Cox/(Cox + Cbc + Cbe) \times V\phi r \quad (1)$$
$$= (Cox/Ctot) \times V\phi r$$

When the drive pulse $\phi rh$ is set at a high potential at time t2, a transistor Qr is turned on.

When the transistor B is forward-biased, the base potential VB is abruptly decreased. A time interval TC between time t2 and time t3 is a so-called refresh time interval.

The drive pulse $\phi r$ is set at zero at time t3, and a voltage $-Va$ is added to the base voltage VB, so that the base voltage VB is set at V2. This reverse-biased state is the accumulation state.

The above description was confined to one photoelectric transducer element. However, a line or area sensor has a large number of photoelectric transducer elements. The capacitances of the capacitors Cox, Cbc, and Cbe between a large number of photoelectric transducer elements vary by a few fractions of 1%. For example, if the following conditions are given:

$$Cox = Cbc = Cbe \approx 0.014 \text{ pF, and } V\phi r = 5 \text{ V}$$

and the capacitance variation is 0.2%, then a variation $\Delta Va$ in capacitance division voltage Va is about 3 mV.

The variation $\Delta Va$ can be reduced by refreshing. However, when the refresh mode is changed to an accumulation operation mode (time t3), the variation occurs again to produce $\Delta Vb$. The variation $\Delta Vb$ does not satisfy relation $\Delta Vb = -\Delta Va$, and the correlation cannot be established therebetween according to test results.

The above fact is assumed to be derived from different bias voltage dependencies of Cbc and Cbe.

In the next read cycle, when the transistor B is forward-biased, the variation in base potential thereof is approximated as follows:

$$\Delta V^2 \approx \Delta Va^2 + \Delta Vb^2 + 2K\Delta Va\Delta b \quad (2)$$

for K is $-1$ or more. As a result, the variation $\Delta V$ becomes steady drive noise of about 4 to 5 mV.

The variation in leakage component of such a drive pulse (to be referred to as drive noise hereinafter) is eliminated according to the following conventional technique. That is, the above drive noise is stored in a memory means and is read out and subtracted from the signal read out from the sensor to obtain a true information signal.

The conventional drive noise correction technique described above requires a bulky, expensive photoelectric transducer element which does not have any industrial advantage.

In particular, in case the numbers of elements arranged in the horizontal direction and vertical direction are five hundred respectively, an area sensor requires 250,000 photoelectric elements arranged in a matrix form. In addition, when the resolution of the sensor is also taken into consideration, a memory of several megabits is required.

The unnecessary signals such as drive noise and a dark signal pose serious problems when an image of a dark object is to be picked up, i.e., image pickup at a low intensity. In the low-intensity image pickup mode, an information signal level is low and accordingly the S/N ratio is degraded. As a result, image quality is degraded. In order to improve image quality, the unnecessary signals must be reduced.

As described above, however, the dark signal primarily depends on temperature and charge accumulation time, although the drive noise rarely depends thereon. If these unnecessary signals are to be eliminated, the dark signal must be separated from the drive noise and a correction coefficient must be determined, thus requiring a large-capacity memory. As a result, signal processing is complicated and expensive, and an image pickup apparatus is undesirably bulky.

SUMMARY OF THE INVENTION

It is an object of the present invention to eliminate the conventional drawbacks described above.

It is another object of the present invention to eliminate variations in drive noise in units of sensor cells.

It is still another object of the present invention to compensate for variations in electrical characteristics of a plurality of amplifiers arranged for sensor cells.

In order to achieve the above objects according to an aspect of the present invention, there is provided a solid state image pickup apparatus having a selector for selecting a plurality of sensor signals through corresponding amplifiers, comprising a processing circuit for calculating a difference between a selected sensor signal and a reference signal selected through the same circuit for selecting the sensor signal.

The sensor signal selected by the selector, therefore, includes a noise component caused by variations in amplifier characteristics since the sensor signal is amplified by the corresponding amplifier. For this reason, the reference signal is selected through the same amplifier which has amplified the sensor signal, so that the amplifier noise is superposed on the reference signal. A difference between the selected sensor signal and the selected reference signal is calculated to eliminate the noise component.

According to another aspect of the present invention, there is provided a photoelectric transducer apparatus having storage means for storing a signal from a photoelectric transducer element, wherein the storage means comprises first storage means for storing the signal read out from the photoelectric transducer element and second storage means for storing a residual signal after the photoelectric transducer element is refreshed, and further comprising difference processing means for calculating a difference between the readout and residual signals respectively stored in the first and second storage means.

Since the residual signal obtained upon completion of refreshing is subtracted from the readout signal, the unnecessary components such as a dark signal and drive noise of the photoelectric transducer element can be eliminated.

A MOS, electrostatic induction, or base accumulation type photosensor may be used as a photoelectric transducer element "Refreshing" of the photoelectric transducer element means erasure of optical information of the photoelectric transducer element. In some photosensors, optical information is erased simultaneously when the information is read out. However, in some photosensors, optical information is kept unerased even after the information is read out.

According to still another aspect of the present invention, in order to eliminate the conventional drawbacks described above, there is provided a solid state image pickup apparatus comprising a plurality of photoelectric transducer elements, first storage means, arranged in units of photoelectric transducer elements, for storing a video signal, second storage means, arranged in units of photoelectric transducer elements, for storing noise components, first readout means for simultaneously and independently reading out signals for photoelectric transducer elements of a plurality of horizontal lines from the first storage means, and second readout means for adding signals for the photoelectric transducer elements of the plurality of horizontal lines from the second storage means and for reading out a sum signal.

With the above arrangement, it is assumed that the drive noise is generated as a sum of noise components generated in the refresh, charge accumulation, and readout modes of the photoelectric transducer element and the drive noise level is substantially identical in each mode. A difference between the photoelectric transducer signal read out upon completion of exposure and drive noise read out in the photoelectric transducer signal readout mode is calculated to eliminate the drive noise. It should be noted that the noise components are read out after they are added, thereby reducing the number of read lines.

According to still another aspect of the present invention, in order to eliminate the conventional drawbacks described above, there is provided a solid state image pickup apparatus comprising photoelectric transducer elements, a plurality of storage capacitors for storing readout signals when the photoelectric transducer elements are read-accessed a plurality of times, dot sequential processing means for converting signals from the storage capacitors into a dot sequential signal, and clamping means for clamping some components of the dot sequential signal from the dot sequential processing means.

With the above arrangement, it is assumed that the drive noise is generated as a sum of noise components generated in the refresh, charge accumulation, and readout modes of the photoelectric transducer element and the drive noise level is substantially identical in each mode. The photoelectric transducer signal read out upon completion of exposure and drive noise read out in the photoelectric transducer signal readout mode are converted into a dot sequential signal, and the drive noise component is clamped, thereby eliminating the drive noise included in the photoelectric transducer signal components.

The above and other objects, features, and advantages of the present invention will be apparent from the following detailed description in conjunction with the accompanying drawings.

BRIEF DESCRIPTION OF THE DRAWINGS

FIGS. 2A and 2B are schematic circuit diagrams showing a solid state image pickup apparatus according to an embodiment of the present invention;

DETAILED DESCRIPTION OF THE PREFERRED EMBODIMENTS

Figure 1A:
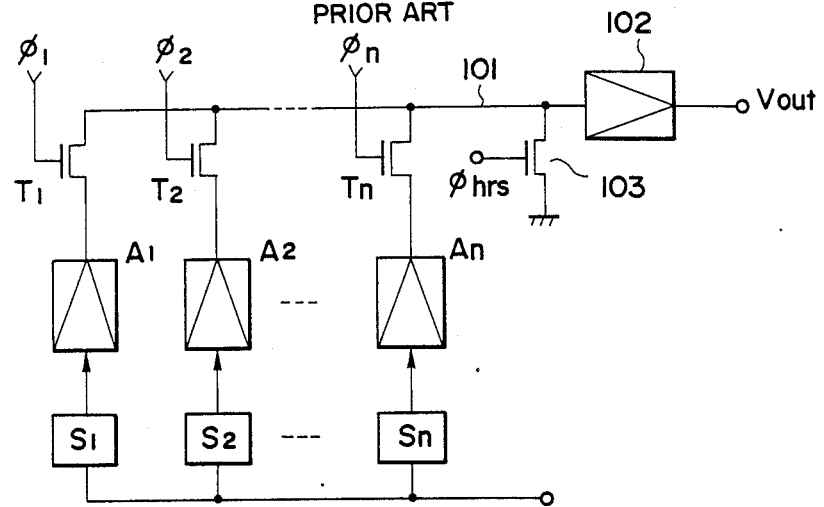
FIG. 1A is a schematic circuit diagram of a conventional solid state image pickup apparatus.
Figure 1B:
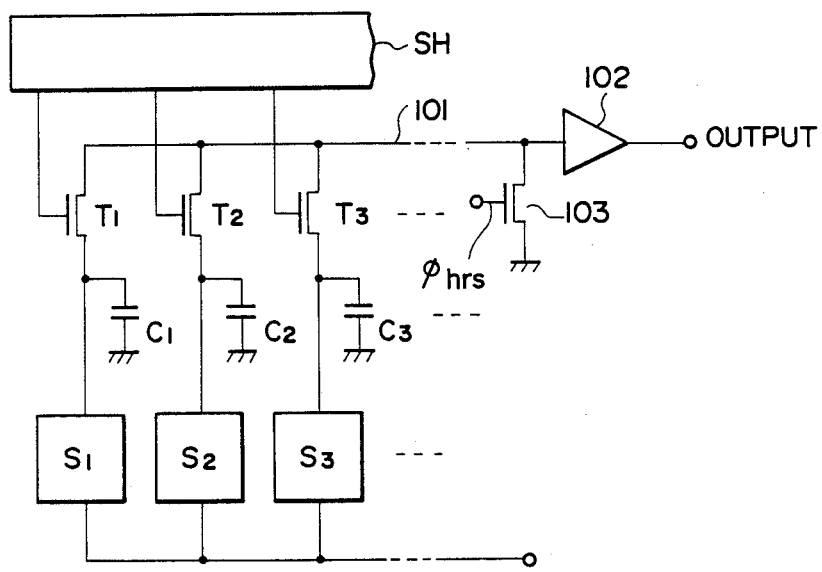
FIG. 1B is a schematic view of another conventional solid state image pickup apparatus.

Preferred embodiments of the present invention will be described with reference to the accompanying drawings hereinafter.

FIG. 2A is a schematic circuit diagram of a solid state image pickup apparatus according to an embodiment of the present invention.

Referring to FIG. 2A, switches SW1 to SWn are arranged to select corresponding inputs in response to pulses $\phi c1$ to $\phi cn$. The switches SW1 to SWn respectively receive sensor signals S1 to Sn from photosensors S1 to Sn arranged in a line or a matrix form. The switches SW1 to SWn also receive signals E from reference signal sources E, respectively.

The output terminals of the switches SW1 to SWn are respectively connected to the input terminals of amplifiers A1 to An. The output terminals of the amplifiers A1 to An are connected to an output line 101 through corresponding transistors T1 to Tn. Pulses $\phi 1$ to $\phi n$ from a scanning circuit SH such as a shift register are respectively supplied to the gate electrodes of the transistors T1 to Tn. The transistors T1 to Tn are turned on in response to the pulses $\phi 1$ to $\phi n$.

The output line 101 is grounded through a transistor 103. A pulse $\phi hrs$ is applied to the gate electrode of the transistor 103. The output line 101 is also connected to a difference processing circuit 1. An output signal Vout free from noise components is output from the difference processing circuit 1.

In the difference processing circuit 1 in this embodiment, the output line 101 is connected to an amplifier 11. The input terminals of sample/hold (S/H) circuits 12 and 13 are connected to the output terminal of the amplifier 11. Pulses $\phi h1$ and $\phi h2$ as control signals are respectively supplied to the S/H circuits 12 and 13 so that the S/H circuits 12 and 13 hold the inputs at the input timings of these pulses respectively. The output terminals of the S/H circuits 12 and 13 are respectively connected to the noninverting and inverting input terminals of a differential amplifier 14. The output signal Vout is output from the differential amplifier 14.

The operation of this embodiment will be described below.

When the reference E is input to the amplifier A1 upon operation of the switch SW1, the reference signal E is amplified by the amplifier A1, and an amplified signal E1' is output to the transistor T1. In this case, only the transistor T1 is kept on in response to the pulse $\phi 1$, and other transistors T2 to Tn are kept off. The reference signal E1' is selected by the transistor T1 and appears on the output line 101. The reference signal E1' is held in the S/H circuit 12 through the amplifier 11. More specifically, the pulse $\phi h1$ is supplied to the S/H circuit 12 when it holds the reference signal E1'.

The reference signal E1' held by the S/H circuit 12 is a signal reflecting variation characteristics of the amplifier A1, i.e., a signal including a noise component N1 which becomes a steady pattern noise. In other words, $E1' = E + N1$.

Subsequently, the transistor 103 is turned on in response to the pulse $\phi$hrs to remove the charge left on the output line 101. An output signal from the sensor S1 is input to the amplifier A1 through the switch SW1. In the same manner as described above, a sensor signal S1' amplified by the amplifier A1 appears on the output line 101 through the ON transistor T1 and is held by the S/H circuit 13 through the amplifier 11.

The sensor signal S1' held by the S/H circuit 13 also reflects variation characteristics, i.e., a signal including the noise component N1 (S1'=S1+N1).

When the reference signal E1' and the sensor signal S1' are respectively held by the S/H circuits 12 and 13, the signals S1' and E1' are input to the differential amplifier 14. The output Vout from the differential amplifier 14 is a difference (S1'−E1') between the sensor and reference signals S1' and E1', thereby obtaining a signal (S1−E) free from the noise component N1. In this case, the reference signal E represents the reference level of the sensor signal S1, so that E=0 is established. Therefore, the output signal Vout is the sensor signal S1 before being subjected to the influence of the amplifier A1.

When the sensor signal S1 is output in this manner, the residual charge on the output line 101 is eliminated by the transistor 103. At the timings in the same manner as described above, the sensor signals S2 to Sn free from the noise components N2 to Nn are sequentially output from the differential amplifier 14.

In the above description, the reference signal E is read out prior to the corresponding sensor signal. However, each sensor signal may be read out prior to the reference signal E.

In the above description, the reference and sensor signals E1' and S1' are held in the separate S/H circuits, respectively. However, one of the S/H cicuits may be omitted, and the output terminal of the amplifier 11 may be directly connected to the amplifier 14 (FIG. 2B). In this case, one readout signal is held by the S/H circuit 12 in response to the pulse $\phi$h1, and the output signal Vout is output from the differential amplifier 14 at the read timing of the other readout signal.

Figure 3:
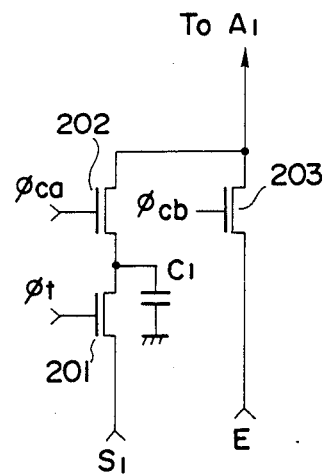
FIG. 3 is a circuit diagram showing an arrangement of switches SW1 to SWn in the apparatus of FIG. 2A.

FIG. 3 is a circuit diagram showing an arrangement of switches SW1 to SWn in the apparatus shown in FIG. 2A.

Referring to FIG. 3, a transistor 201 is turned on in response to a pulse $\phi$t to store the sensor signal S1 in a capacitor C1. Subsequently, a transistor 203 is turned on in response to a pulse $\phi$cb to output the reference signal E to the amplifier A1.

When the reference signal E1' is held as described above, the transistor 202 is turned on in response to a pulse $\phi$ca to output the sensor signal S1 from the capacitor C1 to the amplifier A1.

The switches SW2 to SWn have the same arrangement as that of the switch SW1, and operations of the switches SW2 to SWn are also the same as that of the switch SW1.

Figure 4:
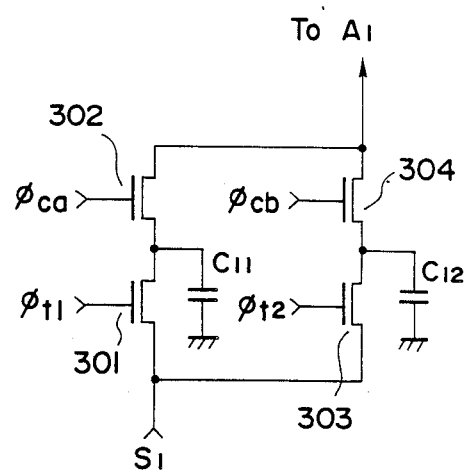
FIG. 4 is a circuit diagram showing another arrangement of switches SW1 to SWn in the apparatus of FIG. 2A.

FIG. 4 is a circuit diagram showing another arrangement of the switches SW1 to SWn in the apparatus of FIG. 2A.

In this arrangement, the reference signal E is generated by drive noise caused by variations in leakage component of the sensor.

Referring to FIG. 4, a transistor 301 is turned on in response to a pulse $\phi$t1 to store the sensor signal S1 in a capacitor C11. Subsequently, a transistor 303 is turned on in response to a pulse $\phi$t2. A sensor signal representing absence of optical information or the dark state thereof serves as the reference signal E. This reference signal E is stored in a capacitor C12. In this state, a drive noise component of the corresponding sensor is stored in the capacitor C12. In the same manner as described above, a transistor 304 is turned on to output the reference signal E from the capacitor C12 to an amplifier A1 and then a transistor 302 is turned on to output the sensor signal S1 from the capacitor C11 to the amplifier A1.

By using the sensor drive noise component as the reference signal E, the output Vout (=S1'−E1') from the differential amplifier 14 is free from the sensor drive noise component as well as the noise component N1 of the amplifier A1.

Figure 5A:
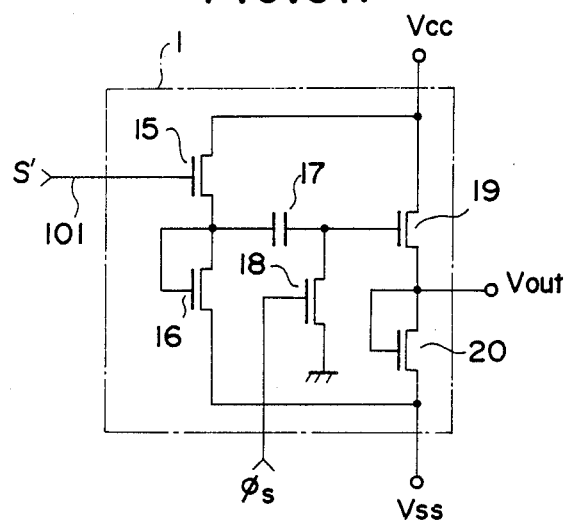
FIG. 5A is a circuit diagram showing another arrangement of a difference processing circuit in the apparatus of FIG. 2A.
Figure 5B:
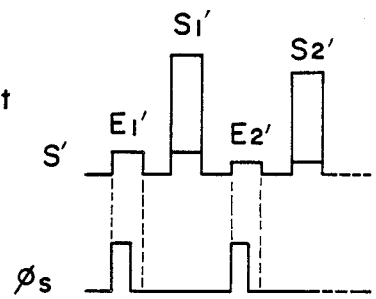
FIG. 5B is a timing chart for explaining the operation of the difference processing circuit shown in FIG. 5A.

FIG. 5A is a circuit diagram showing another arrangement of the difference processing circuit in the apparatus shown in FIG. 2A, and FIG. 5B is a timing chart for explaining the operation thereof.

Difference processing is performed by a clamping circuit in this arrangement.

Referring to FIGS. 5A and 5B, the reference signal E1' amplified by the amplifier A1 appears on the output line 101 and is input to a clamp circuit through an amplifier comprising transistors 15 and 16. In this case, the clamp circuit comprises a capacitor 17 and a transistor 18. Since the transistor 18 in the clamp circuit is kept on in response to a clamp pulse $\phi$s, the level of the reference signal E1' is clamped as the reference level. As a result, the sensor signal S1' subsequently appearing on the output line 101 is amplified by an amplifier of transistors 19 and 20 using the reference signal E1' as a reference level. In the same manner as in FIG. 1, the output signal Vout obtained by removing the reference signal E1' from the sensor signal S1' is obtained. Similarly, the clamp pulse $\phi$s is generated at a read timing of the reference signal E1', and the sensor signals S1 to Sn free from the noise components are sequentially output.

Figure 6A:
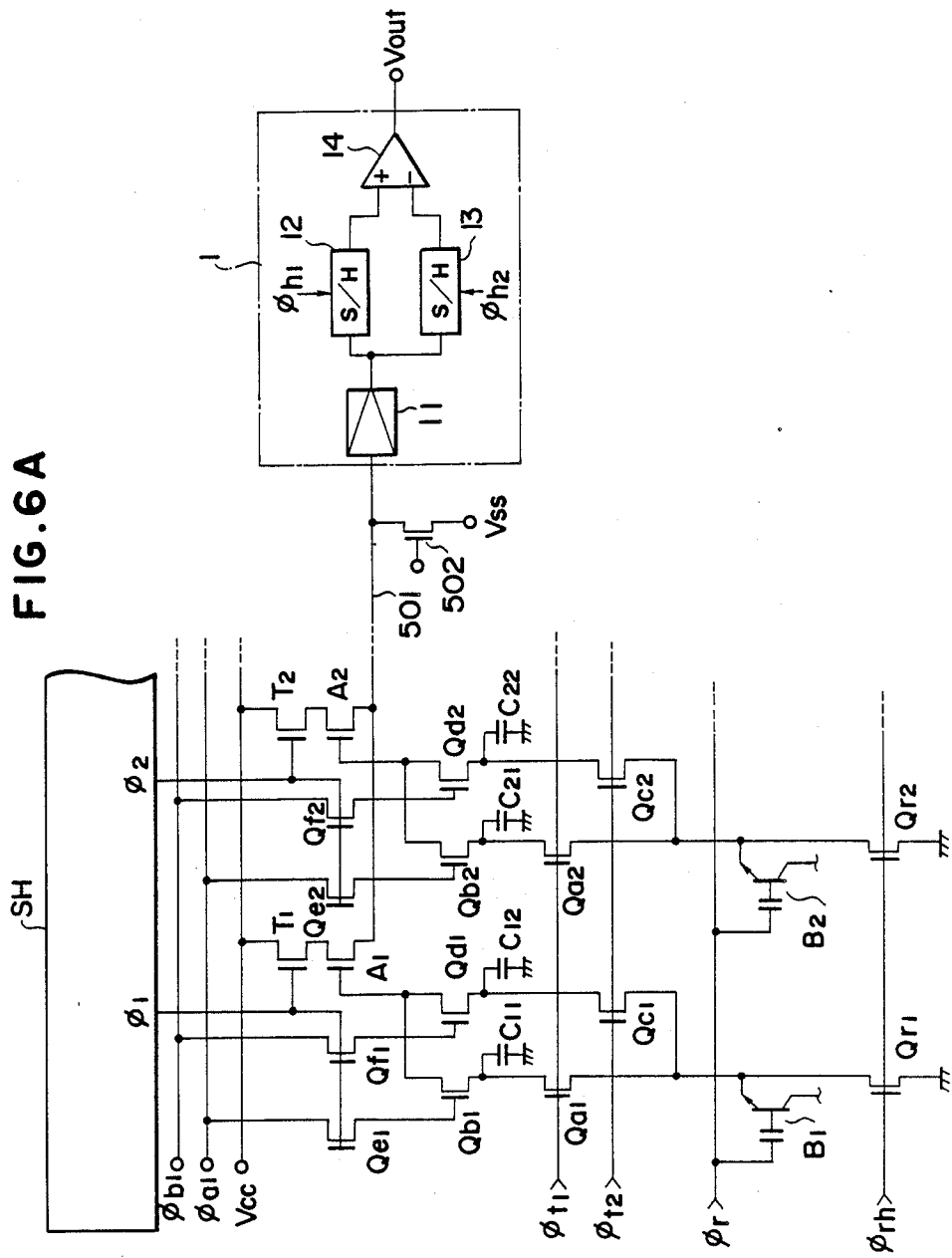
FIG. 6A is a schematic circuit diagram showing a solid state image pickup apparatus according to another embodiment of the present invention.
Figure 6B:
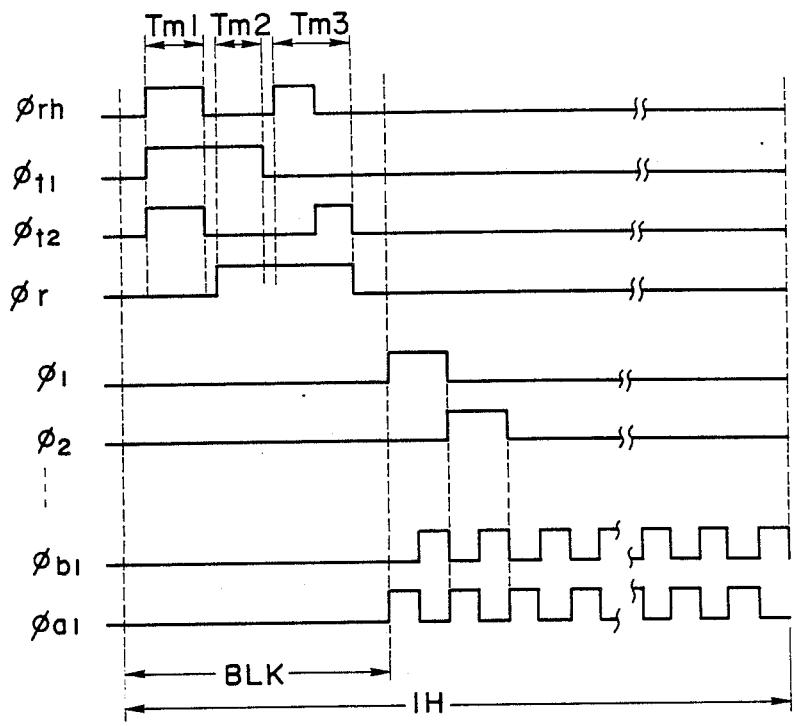
FIG. 6B is a timing chart for explaining the operation of the apparatus shown in FIG. 6A.

FIG. 6A is a schematic circuit diagram of a solid state image pickup apparatus according to another embodiment of the present invention, and FIG. 6B is a timing chart for explaining the operation thereof.

Referring to FIG. 6A, sensors B1 to Bn (to be referred to as B hereinafter) are base accumulation type phototransistors. A base potential of each transistor is controlled through a capacitor, and the carriers excited upon incidence of light are accumulated in the base region of the transistor. The accumulated voltage is read out as a sensor signal, or the accumulated carriers are removed.

A read or refresh pulse $\phi$r is applied to the capacitor electrodes of the sensors B. The emitter electrodes of the sensors B which are adapted to read out sensor signals S1 to Sn (to be referred to as S hereinafter) are grounded through transistors Qr1 to Qrn (to be referred to as Qr hereinafter), respectively. The emitter electrodes are connected to temporary storage capacitors C11 to Cn1 through transistors Qa1 to Qan (to be referred to as Qa hereinafter) and to temporary storage capacitors C12 to Cn2 through transistors Qc1 to Qcn (to be referred to as Qc hereinafter), respectively.

The capacitors C11 to Cn1 are connected to the gate electrodes of amplifiers A1 to An through transistors Qb1 to Qbn, respectively. The capacitors C12 to Cn2 are connected to the gate electrodes of the amplifiers A1 to An through transistors Qd1 to Qdn, respectively.

A voltage Vcc is applied to the first terminals of the amplifiers A1 to An, and an output line 501 is commonly connected to the second input terminals thereof.

A pulse $\phi$a1 is applied to the gate electrodes of the transistors Qb1 to Qbn through transistors Qe1 to Qen. A pulse $\phi$b1 is applied to the gate electrodes of the transistors Qd1 to Qdn through transistors Qf1 to Qfn.

Pulses $\phi$1 to $\phi$n from a scanning circuit SH are sequentially supplied to the gate electrodes of the transistors Qe1 to Qen, Qf1 to Qfn, and T1 to Tn, respectively.

A transistor 502 is connected to the output line 501, and a voltage Vss is applied to the output line 501 through the transistor 502. A signal S' amplified by each amplifier and appearing on the output line 501 is input to the difference processing circuit 1, and difference processing as described above is performed. It should be noted that the difference processing circuit 1 in this embodiment is of a differential type using the S/H crcuit shown in FIG. 2A.

The operation of the apparatus of this embodiment will be described with reference to FIG. 6B.

Assume that carriers corresponding to the intensity levels of the incident light are stored in the base regions of the sensors B, respectively.

For a time interval Tm1, the transistors Qr are kept on in response to the pulse $\phi$rh, and the emitter electrodes of the sensors B and the vertical lines are grounded At the same time, the transistors Qa and Qc are turned on in response to the pulses $\phi$t1 and $\phi$t2 to clear the carriers from the capacitors C11 to Cn1 and C12 to Cn2, respectively.

For a time interval Tm2, the transistors Qa are kept on in response to the pulse $\phi$t1 to supply the read pulse $\phi$r to the sensors B. Therefore, the sensor signals S from the sensors B are stored in the capacitors C11 to Cn1, respectively. These sensor signals include the drive noise components of the corresponding sensors.

For a time interval Tm3, the transistors Qr are kept on in response to the pulse $\phi$rh to ground the emitters of the sensors B. The sensors B are refreshed in response to the refresh pulse $\phi$r. Upon completion of refreshing, the transistors Qrh are turned off, and the transistors Qc are turned on in response to the pulse $\phi$t2. During this period, the read pulse $\phi$r is applied to read out the signals from the sensors B. Their drive noise components, i.e., the above-mentioned reference signals E1 to En are respectively stored in the capacitors C12 to Cn2. Thereafter, the pulse $\phi$r falls to cause the sensors B to start charge accumulation.

The above operations are performed during a blanking period BLK, and the signals temporarily stored in the corresponding capacitors are sequentially read out onto the output line 501.

The transistors T1, Qe1, and Qf1 are turned on in response to the pulse $\phi$1. The voltage Vcc is applied to the amplifier A1, and the amplifier A1 is rendered operative (other amplifiers A2 to An are rendered inoperative). The pulse $\phi$a1 rises in synchronism with the pulse $\phi$1 and the transistor Qb1 is turned on through the ON transistor Qe1. The sensor signal S1 stored in the capacitor C11 is amplified by the amplifier A1, and the amplified signal appears on the output line 501 and is then held in an S/H circuit 12 in a difference processing circuit 1.

Subsequently, the pulse $\phi$b1 rises and then the transistor Qd1 is turned on through the transistor Qf1. The reference signal E1 stored in the capacitor C12 is amplified by the amplifier A1, and the amplified signal appears on the output line 501 and then held by an S/H circuit 13.

It can be assumed that a potential of an input to the amplifier A1 can be reset to a reference potential for a period from the time when the sensor signal S1 is output from the capacitor C11 to the amplifier A1 and to the time when the reference signal E1 is output from the capacitor C12.

However, most of the input capacitance of the amplifier A1 is an overlap capacitance of the transistors. The input capacitance is sufficiently smaller than the capacitances of the capacitors C11 and C12, and the residual charge can be neglected. Steady pattern noise caused by variations in amplifier characteristics is typical when the image signal is small. In this case, the residual charge is further decreased.

For the above reasons, a means for resetting the input terminals of the amplifiers A1 to An is omitted. However, in an application wherein the residual charge cannot be neglected, a reset means must be connected to the inputs of the amplifiers A.

When the sensor and reference signals S1' and E1' are respectively held by the S/H circuits 12 and 13, the above-mentioned differenc processing is performed to cause the differential amplifier 14 to produce the sensor signal S1 as the output signal Vout free from the drive noise component and the noise component N1. Similarly, the sensor outputs S1 to Sn are sequentially output.

When all sensor signals are output, the next sensor signals corresponding to the incident light are stored in the sensors B. In the same manner as described above, sensor read access and refreshing are performed for the blanking period BLK. Charge accumulation of the sensors B and dot sequential operation of the sensor signals temporarily stored in the capacitors are simultaneously performed.

When the clamp circuit shown in FIG. 5 is used in the difference processing circuit 1, the capacitor C12 for charging the reference signal E1 and then the capacitor C11 for charging the sensor signal S1 must be discharged. This applies to the signal readout operations of the sensor signals S2 to Sn.

Figure 7:
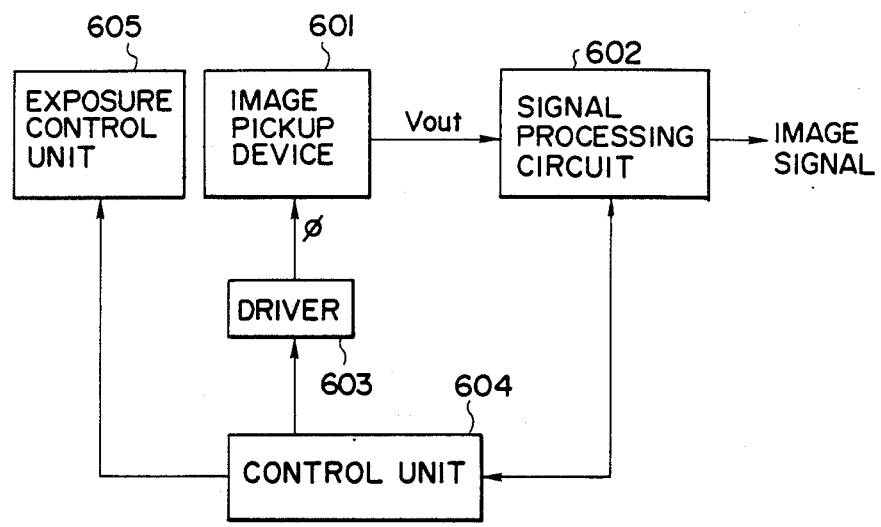
FIG. 7 is a block diagram showing an image pickup system using the apparatus (of any embodiment described above) as an image pickup device.

FIG. 7 shows a schematic arrangement of an image pickup system using any one of the image pickup apparatuses of the embodiments as an image pickup device.

Referring to FIG. 7, an image pickup device 601 comprises an image pickup apparatus of any one of the above embodiments. The gain or the like of the output signal Vout is controlled by a signal processing circuit 602, and the resultant signal is output as a video signal.

Various pulses $\phi$ for driving the image pickup device 601 are supplied from a driver 603. The driver 603 is operated under the control of a control unit 604. The control unit 604 controls the gain or the like of the signal processing circuit 602 on the basis of the output from the image pickup device 601 and also controls an exposure control unit 605 to adjust an amount of light incident on the image pickup device 301.

As described above, in the solid state image pickup apparatus according to the above embodiments, a difference between the selected sensor signal and the selected reference signal is calculated to obtain an output signal free from the noise components. Therefore, the variations in readout signal depending on the potential variations of the input/output characteristics of the selector can be corrected. The steady pattern noise caused by the variations in amplifier characteristics can be eliminated.

Figure 1C:
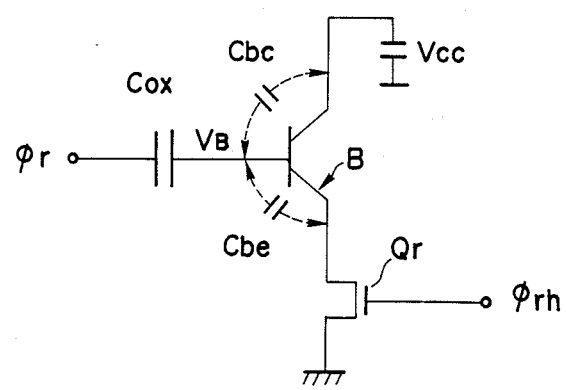
FIGS. 1C to 1E are views for explaining the principle of generation of drive noise of a photoelectric transducer element.
Figure 1D:
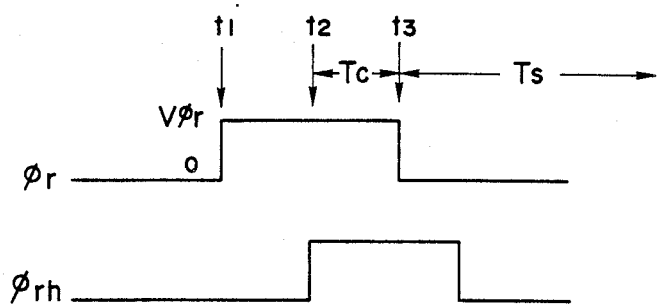
Figure 1E:
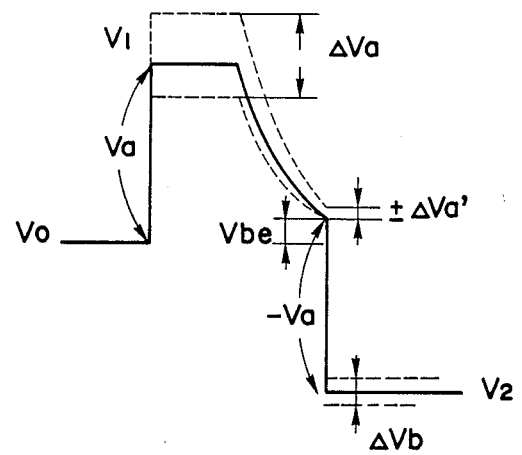

A photoelectric transducer element used in FIGS. 2A to 7 will be described as a supplementary explanation of FIGS. 1C to 1E.

Figure 8A:
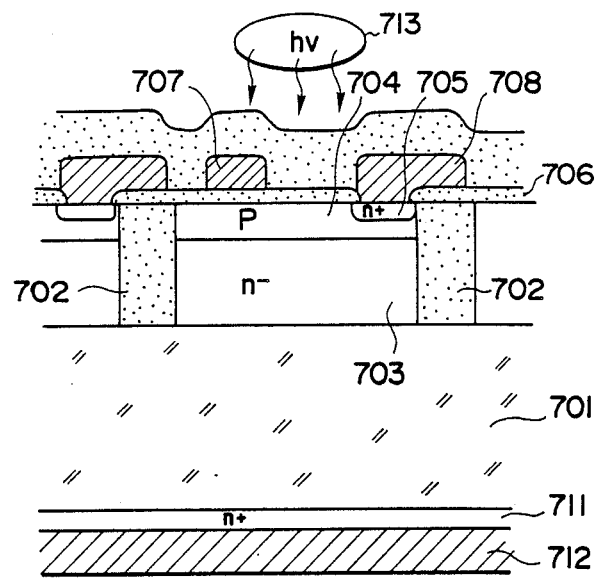
FIG. 8A is a schematic sectional view of a photoelectric transducer cell described in Japanese Patent Laid-Open Gazettes Nos. 12759/1985 to 12765/1985.
Figure 8B:
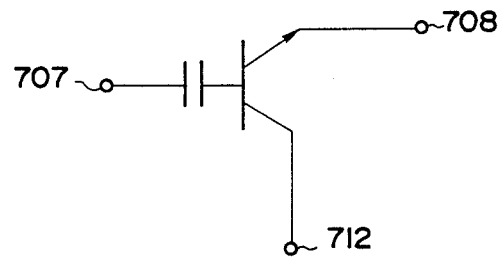
FIG. 8B is an equivalent circuit diagram thereof.

FIG. 8A is a schematic sectional view of a photoelectric transducer cell described in Japanese Patent Laid-Open Gazettes No. 12759/1985 to 12765/1985, and FIG. 8B is an equivalent circuit diagram of the cell.

Referring to FIGS. 8A and 8B, photoelectric transducer cells are formed on an n+-type silicon substrate 701, and each photoelectric transducer cell is electrically insulated from adjacent photoelectric transducer cells by an element isolation region 702 made of SiO$_2$, SiH$_3$N$_4$, or polysilicon.

Each photoelectric transducer cell has the following structure.

A p-type region 704 doped with a p-type impurity is formed on an n⁻-type region 703 formed by an epitaxial technique and having a low impurity concentration. An n+-type region 705 is formed in the p-type region 704 by impurity diffusion or ion implantation. The p-type region 704 and the n+-type region 705 respectively serve as the base and emitter of a bipolar transistor.

An oxide film 706 is formed on the n⁻-type region 703, and a capacitor electrode 707 having a predetermined area is formed on the oxide film 706. The capacitor electrode 707 opposes the p-type region 704 through the oxide film 706 and controls a potential of the p-type region 704 floating upon application of a pulse voltage to the capacitor electrode 707.

In addition, an emitter electrode 708 is connected to the n+-type region 705, an n+-type region 711 having a high impurity concentration is formed on the lower surface of the substrate 701, and a collector electrode 712 is formed to apply a potential to the collector of the bipolar transistor.

The basic operation of the above arrangement will be described. Assume that the p-type region 704 serving as the base of the bipolar transistor is set at a negative potential. Light 713 is incident from the side of the p-type region 704. Holes in the electron-hole pairs generated upon radiation are accumulated in the p-type region 714 and the potential at the p-type region 714 is increased by the accumulated holes in the positive direction (charge accumulation).

Subsequently, a positive read voltage is applied to the capacitor electrode 707, and a read signal corresponding to a change in base potential during charge accumulation is output from the floating emitter electrode 708 (read operation). It should be noted that the amount of accumulated charge is rarely reduced in the p-type region 704 serving as the base of the bipolar transistor, so that read access can be repeated.

In order to remove the holes from the p-type region 704, the emitter electrode 708 is grounded, and a refresh pulse of a positive voltage is applied to the capacitor electrode 708. Upon application of the refresh pulse, the p-type region 704 is forward-biased with respect to the n+-type region 705, thereby removing the holes. When the refresh pulse falls, the p-type region 704 restores the initial state of the negative potential (refresh operation). Charge accumulation, read access, and refreshing are repeated as described above.

In order to restore the initial potential state of the p-type region 704 by refreshing, a refresh pulse having a sufficient pulse width is required. To the contrary, the refresh pulse width must be shortened to achieve high-speed operation. In this case, when the refresh pulse width is short, satisfactory refreshing cannot be performed. Unnecessary components such as a dark signal and drive noise are added to the after image.

Figure 9:
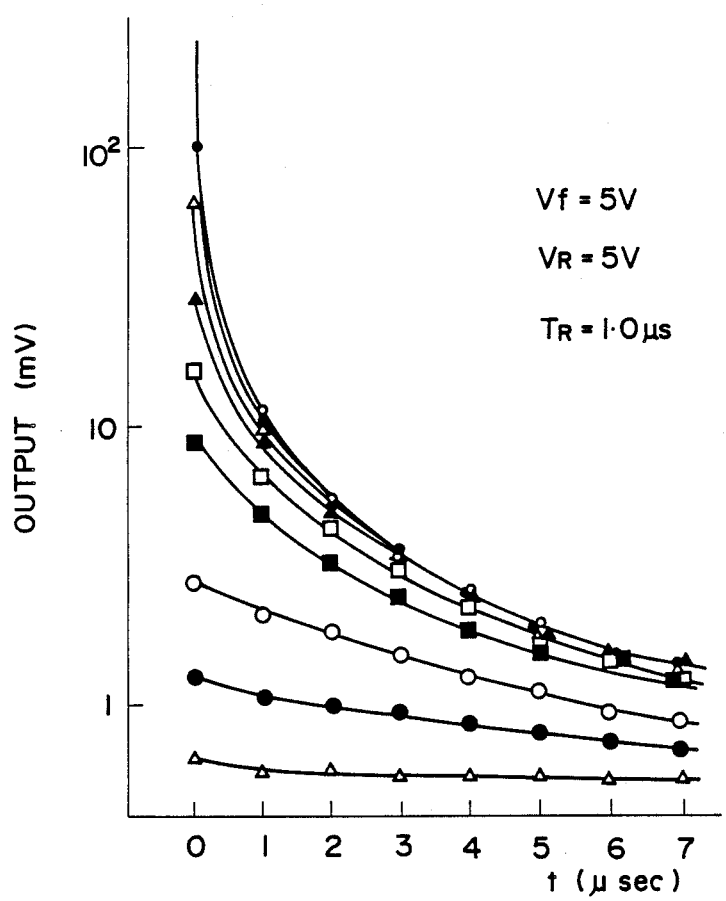
FIG. 9 is a graph showing the relationship between a width t of a refresh pulse applied to the photoelectric transducer cell and a photoelectric transducer cell output after refreshing.

FIG. 9 is a graph showing the relationship between a refresh pulse width t applied to the photoelectric transducer cell and the photoelectric transducer cell output.

Referring to FIG. 9, an output at t=0 is a read signal after charge accumulation and represents a read signal having a level corresponding to the intensity of the incident light.

The output level of such a photoelectric transducer is reduced by refreshing. However, the rate of change in output level and the level of the residual image upon refreshing vary depending on the intensity of the incident light.

When identical refreshing is performed, the levels of the residual signals are not constant. When the intensity of the incident light is high, the level of the residual signal is high. In other words, the after image is typically formed.

The residual signal level of high-intensity incident light is higher than that of low-intensity incident light but is greatly lowered as compared with the initial read signal level. The ratio of the unnecessary components contained in the read signal is substantially low. On the contrary, the residual signal level of the low-intensity incident light is low. A decrease in the residual signal level is small as compared with the initial read signal level. Therefore, the ratio of the unnecessary components included in the read signal is high.

Even in the photoelectric transducer cell having the above characteristics, by subtracting the residual signal obtained upon refreshing from the initial read signal, the above-mentioned specific after image components as well as the unnecessary components such as a dark signal and drive noise can be simultaneously removed.

A second embodiment of the present invention will be described below.

Figure 10:
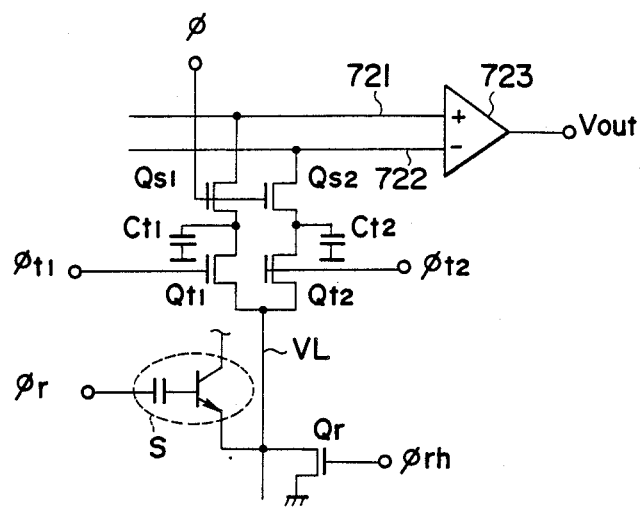
FIG. 10 is a circuit diagram for explaining a basic arrangement of a solid state image pickup apparatus according to still another embodiment of the present invention.

FIG. 10 is a circuit diagram for explaining the basic arrangement of an image pickup element according to the second embodiment of the present invention.

Referring to FIG. 10, an emitter electrode 708 of a photoelectric transducer cell S is connected to a vertical line VL and is grounded through a transistor Qr. The vertical line VL is connected to storage capacitors Ct1 and Ct2 through corresponding transistors Qt1 and Qt2. The capacitors Ct1 and Ct2 are connected to output lines 721 and 722 through transistors Qs1 and Qs2, respectively. The output lines 721 and 722 are connected to the input terminals of a differential amplifier 721, respectively.

A pulse φ from a scanning circuit SH is applied to the gate electrodes of the transistors Qs1 and Qs2. Pulses φt1 and φt2 are applied to the gate electrodes of the transistors Qt1 and Qt2, respectively. A pulse φrh is applied to the gate electrode of the transistor Qr. A read or refresh pulse φr is applied to a capacitor electrode 707 of the photoelectric transducer cell S.

The operation of the above arrangement will be described below.

Figure 11:
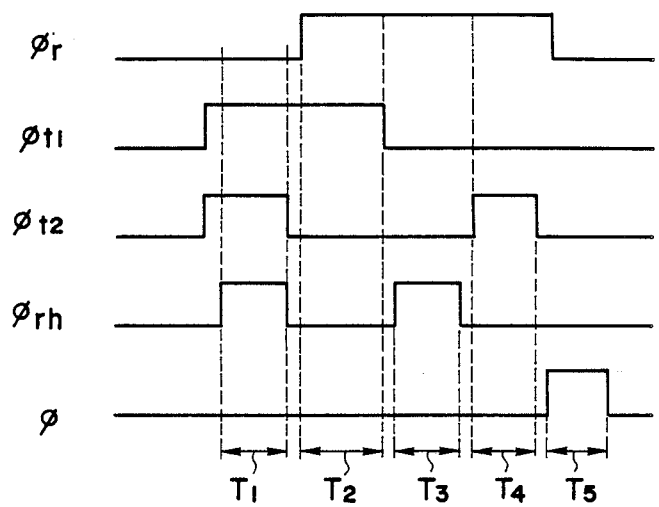
FIG. 11 is a timing chart for explaining the operation of the apparatus shown in FIG. 10.

FIG. 11 is a timing chart for explaining the operation of the circuit shown in FIG. 10.

The transistors Qt1, Qt2, and Qr are turned on in response to the pulses φt1, φt2, and φrh, respectively, to clear the capacitors Ct1 and Ct2 (time interval T1).

Subsequently, the pulse φr is supplied to the capacitor electrode 707 while the transistor Qt1 is kept on.

The read signal from the photoelectric transducer cell S is stored in the capacitor Ct1 (time interval T2).

The transistor Qt1 is turned off while the pulse $\phi r$ is kept applied to the capacitor electrode 707. The transistor Qr is turned on in response to the pulse $\phi rh$. The photoelectric transducer cell S is refreshed in response to the pulse $\phi rh$ (time interval T3).

Upon completion of refreshing, the transistor Qt2 is turned on in response to the pulse $\phi t2$ while the pulse $\phi r$ is kept applied to the capacitor electrode 707. The residual signal of the photoelectric transducer cell S is stored in the capacitor Ct2 (time interval T4).

When the read and residual signals are stored in the capacitors Ct1 and Ct2, respectively, the transistors Qs1 and Qs2 are turned on in response to the pulse $\phi$. The read and residual signals are input to the differential amplifier 723 through the corresponding output lines 721 and 722. A signal Vout proportional to the difference between the read and the residual signals is output from the differential amplifier 723 (time interval T5).

As described above, the signal Vout is a signal free from the after image component and the unnecessary components such as a dark signal and drive noise and accurately corresponds to the intensity of the incident light. In particular, unnecessary component removal on the low-intensity side is effective, and an S/N ratio can be greatly increased.

Figure 12:
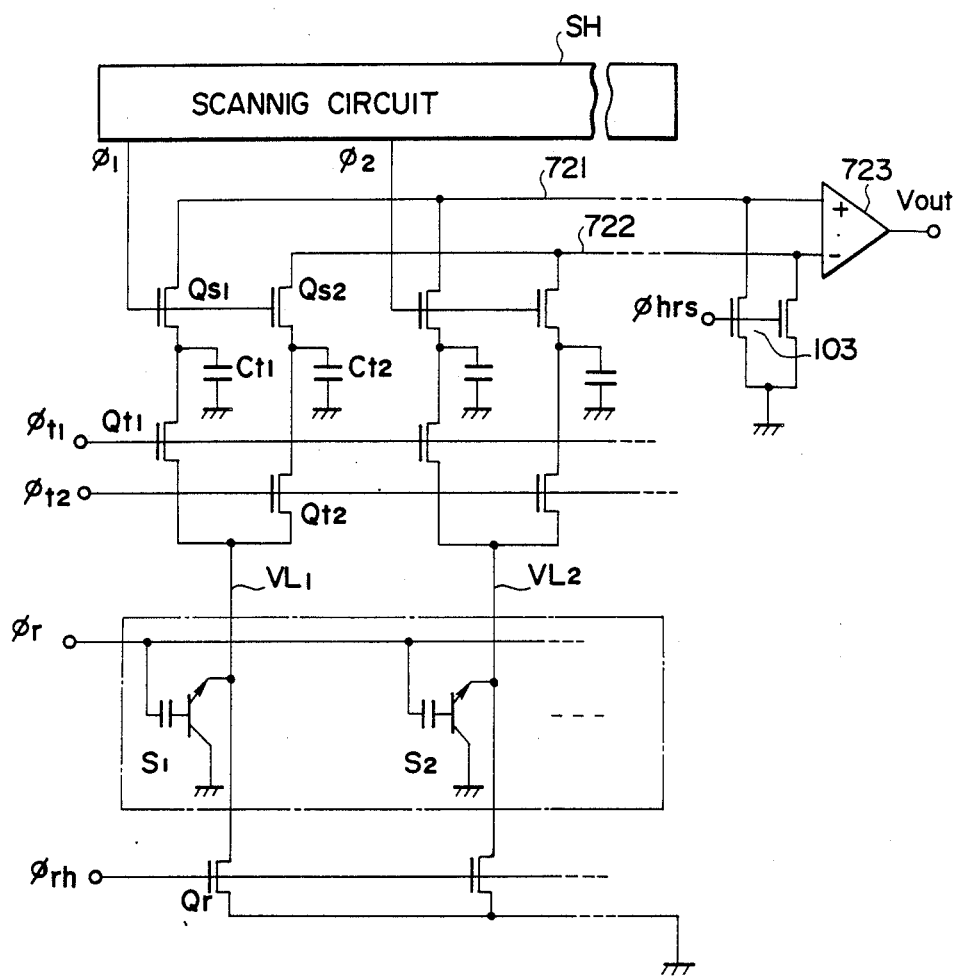
FIG. 12 is a circuit diagram showing the overall arrangement of the apparatus shown in FIG. 10.

FIG. 12 is a circuit diagram of an image pickup system of this embodiment. The circuit in FIG. 12 has n circuits of FIG. 10.

Referring to FIG. 12, the emitter electrodes 708 of photoelectric transducer cells S1 to Sn are respectively connected to vertical lines VL1 to VLn. The same circuits as in FIG. 10 are connected to the vertical lines. The gate electrodes of the transistors Qr are commonly connected, and the pulse $\phi rh$ is applied thereto. The gate electrodes of the transistors Qt1 and the gate electrodes of the transistor Qt2 are also commonly connected, and the pulses $\phi t1$ and $\phi t2$ are supplied to the common gate electrodes, respectively.

The gate electrodes of the transistors Qs1 and Qs2 corresponding to the photoelectric transducer cells S1 to Sn are connected to the parallel output terminals of the scanning circuit SH and receive the pulses $\phi 1$ to $\phi n$, respectively. The transistors Qs1 are commonly connected to the output line 721 and the transistors Qs2 are commonly connected to the output line 722. These output lines are grounded through corresponding transistors 103. A reset pulse $\phi hrs$ is supplied to the gate electrodes of the transistors 103.

A mode of operation of the arrangement described above will be briefly described with reference to FIG. 13A.

FIG. 13 is a timing chart for explaining the operation of the above arrangement.

As already described above, the capacitors Ct1 and Ct2 corresponding to each photoelectric transducer cell are cleared during the time interval T1. During the time interval T2, the read signal from each photoelectric transducer cell is stored in the corresponding capacitor Ct1. During the time interval T3, each photoelectric transducer cell is refreshed. During the time interval T4, the residual signal of each refreshed photoelectric transducer cell is stored in the corresponding capacitor Ct2.

After the read and residual signals of each photoelectric transducer cell are accumulated in the manner described above, the pulse $\phi 1$ from the scanning circuit SH is supplied to the gate electrodes of the transistors Qs1 and Qs2. The read and residual signals stored in the capacitors Ct1 and Ct2 of the photoelectric transducer cell S1 are read out and appear on the output lines 721 and 722. A difference between these signals is calculated by the differential amplifier 723, thereby removing the unnecessary components and hence obtaining the output signal Vout.

When a signal is output from the photoelectric transducer cell S1, the transistor 103 is turned on in response to the pulse $\phi hrs$, and the charges left on the output lines 721 and 722 are removed.

In the same manner as described above, the read and residual signals of the photoelectric transducer cells S2 to Sn are output from the capacitors Ct1 and Ct2 and appear on the output lines 721 and 722 and are subjected to subtractions by the differential amplifier 723, thereby sequentially outputting signals Vout.

Figure 13A:
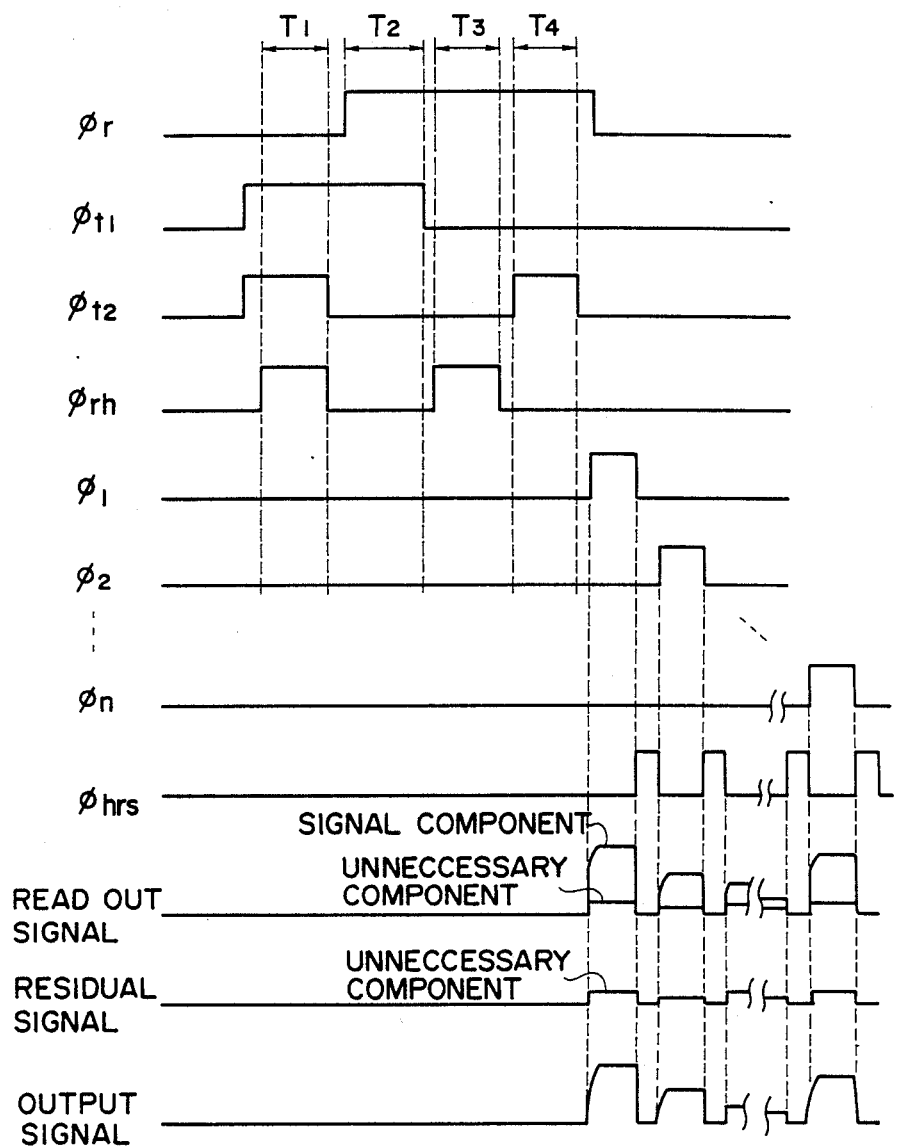
FIGS. 13A and 13B are timing charts for explaining two operation modes of the apparatus shown in FIG. 10.
Figure 13B:
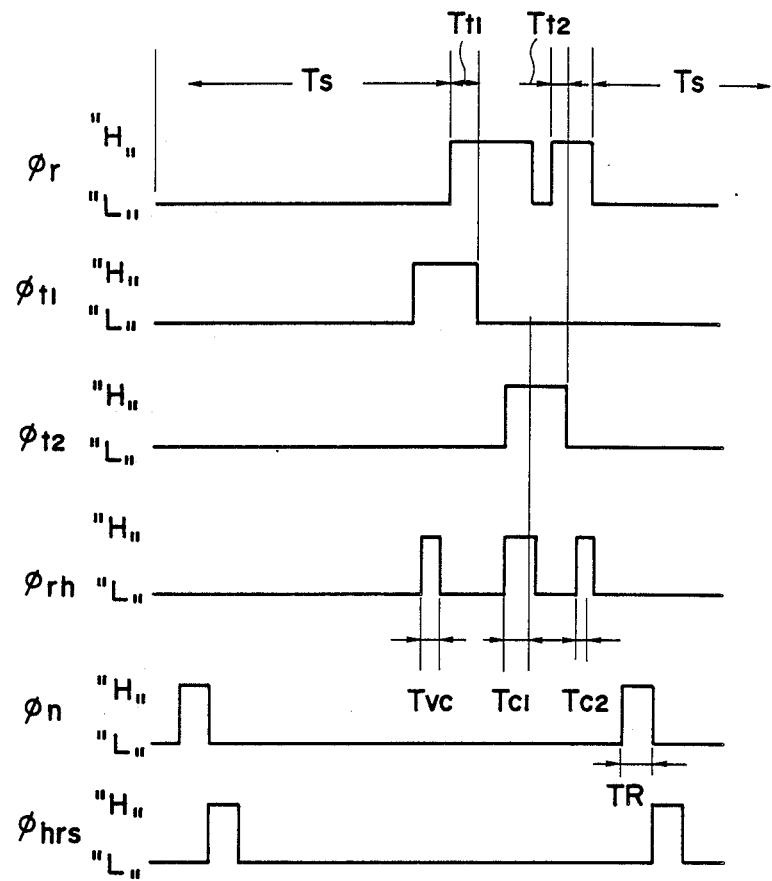

FIG. 13B shows another mode of operation of the above arrangement.

During a time interval Ts, the base electrodes of the cells S are reverse-biased to perform charge accumulation. Upon completion of charge accumulation, unnecessary charges on the vertical transfer line VL and the storage capacitor Ct1 are removed before the photoelectric transducer signals are transferred to the storage capacitor Ct1 within a time interval Tvc.

Refreshing is performed again during a time interval Tc1, and drive noise is transferred to the storage capacitor Ct2 during a time interval Tt2. Thereafter, the cell S is refreshed during a time interval Tc2, and the next charge accumulation cycle is initiated. The photoelectric transducer signal and drive noise which are stored in the storage capacitors Ct1 and Ct2 are output onto horizontal signal lines 721 and 722, respectively.

In the above embodiment, the sensor shown in FIGS. 8A and 8B is exemplified. However, the present invention is not limited to any specific scheme of the photosensor.

The present invention can be applied to a color image pickup apparatus of a scheme for processing a plurality of horizontal line signals.

Figure 14:
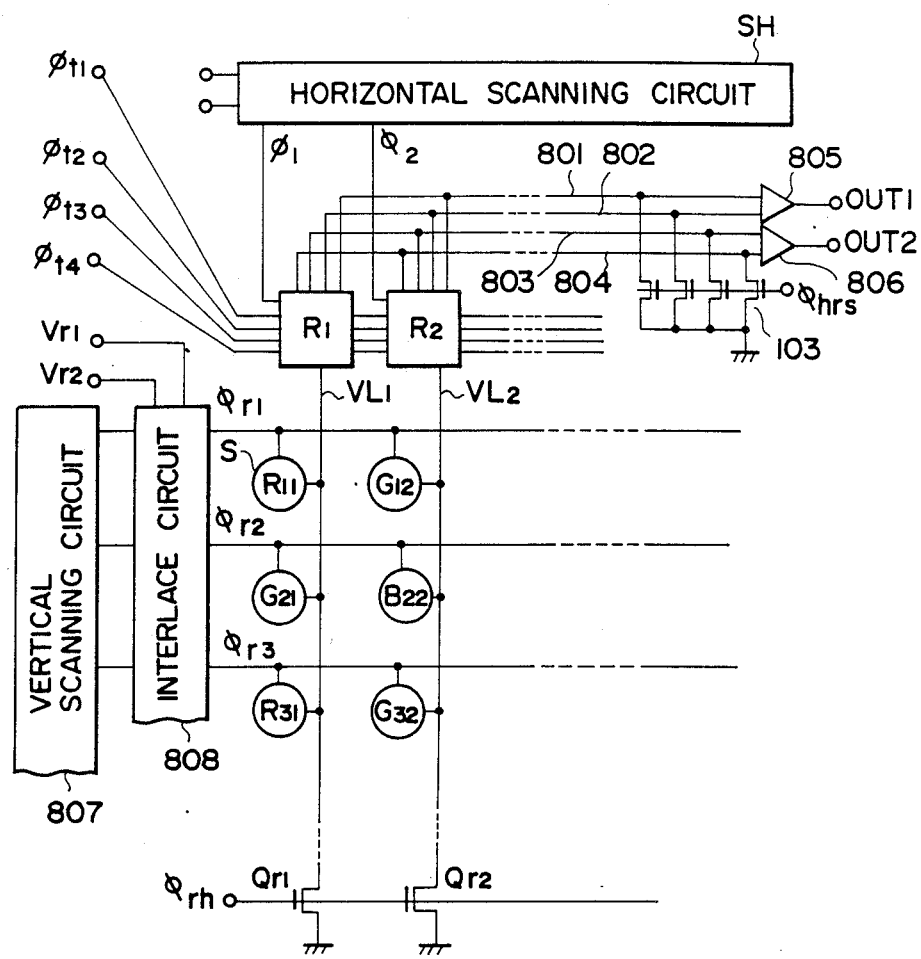
FIG. 14 is a circuit diagram of a solid state image pickup apparatus according to still another embodiment of the present invention.
Figure 15:
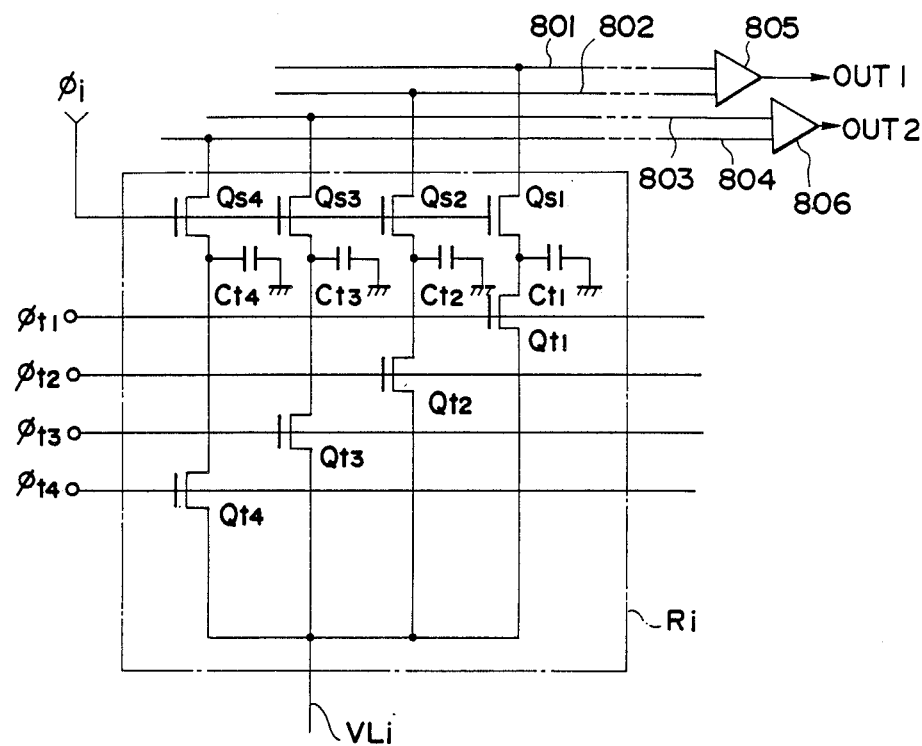
FIG. 15 is a detailed circuit diagram of a readout circuit Ri in the apparatus shown in FIG. 14.

FIG. 14 is a circuit diagram of a third embodiment of the present invention, and FIG. 15 is a detailed circuit diagram of a readout circuit Ri in this embodiment. This embodiment exemplifies a scheme for processing a signal of two horizontal lines. This can apply to any scheme for processing a signal of three or more horizontal lines.

Referring to FIG. 14, photosensors S are arranged in an m × n area. Mosaic R, G, and B filters are arranged on the sensor surface.

Column photosensor outputs are respectively output to the readout circuits R1 to Rn through vertical lines VL1 to VLn.

Referring to FIG. 15, in any readout circuit Ri (i = 1, 2, ... n), the vertical lines VLi are connected to storage capacitors Ct1 to Ct4 through transistors Qt1 to Qt4, and the capacitors Ct1 to Ct4 are connected to output lines 801 to 804 through transistors Qs1 to Qs4, respectively. Since the scheme for processing a signal of two horizontal lines is used, two capacitors for storing the read signals and other two capacitors for storing residual signals are formed.

The gate electrodes of the transistors Qt1 to Qt4 are commonly connected through corresponding readout circuits R1 to R4. Pulses $\phi 1$ to $\phi 4$ are supplied to the gate circuits of the transistors Qt1 to Qt4.

A pulse φi from a horizontal scanning circuit SH is supplied to the transistors Qs1 to Qs4 of the readout circuit Ri. The transistors Qs1 to Qs4 are simultaneously turned on/off.

The output lines 801 and 802 are connected to the input terminals of a differential amplifier 805, and the output lines 803 and 804 are connected to the input terminals of a differential amplifier 806. Signals OUT1 and OUT2 are output from the differential amplifiers 805 and 806, respectively.

Two lines per field are selected by a vertical scanning circuit 807 and an interlace circuit 808. Pairs of two horizontal scanning lines in units of fields are selected in response to pulses Vr1 and Vr2.

The operation of the above circuit will be described with reference to FIG. 16.

Figure 16:
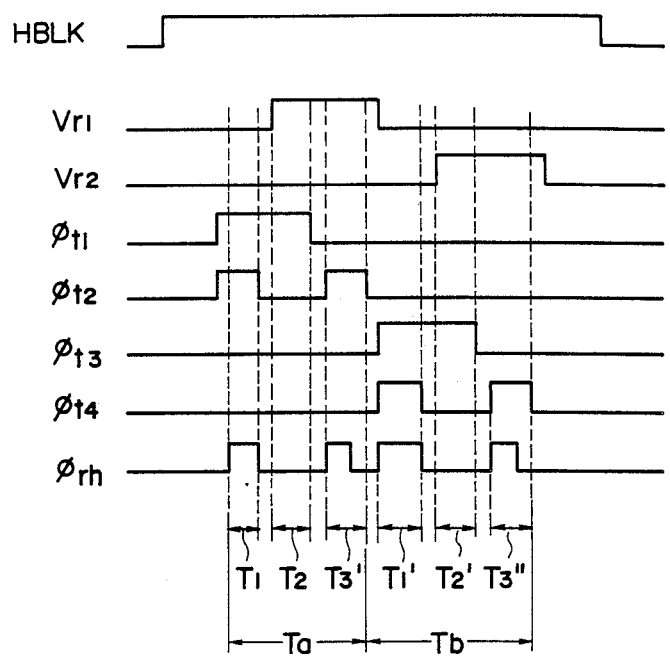
FIG. 16 is a timing chart for explaining the operation of the apparatus shown in FIG. 14.

FIG. 16 is a timing chart for explaining the operation of the above circuit.

Each photosensor read signal and its residual signal for two horizontal lines are read out during a horizontal blanking (HBLK) period and are stored in the storage capacitors in the readout circuits R1 to Rn. Transfer of one of the two horizontal lines is performed during a time interval Ta in response to the pulse Vr1. Transfer of the remaining horizontal line is performed during a time interval Tb in response to the pulse Vr2.

The transfer operations are substantially the same as those in FIG. 12. However, since transfer is performed during the HBLK period, the transfer time can be shortened as compared with a scheme for processing a signal of one horizontal line. Clearing of the residual signal storage capacitor and its charge accumulation are performed during substantially equal time intervals T3' and T3". Smear generated during signal transfer is proportional to the transfer time. In this sense, T2 (T2') and T3' (T3") are shortened to suppress the smearing phenomenon.

The capacitors Ct1 and Ct2 are cleared within a time interval T1 in the time interval Ta. During a time interval T2, a pulse φr1 is supplied to the first horizontal line in response to the pulse Vr1, and read signals of the photosensors on the first horizontal line are stored in the capacitors Ct1 in the readout circuits R1 to Rn. Subsequently, during a time interval T3', the photosensors of the first horizontal line are refreshed, and the residual signals upon completion of refreshing are stored in the capacitors Ct2.

During the next time interval Tb, the same transfer as in the first horizontal line is performed for the second horizontal line in response to the pulse φr2 generated in response to the pulse Vr2. The read and residual signal of each photosensor for the second horizontal line are respectively stored in the capacitors Ct3 and Ct4.

When the read and residual signals of the first and second horizontal lines are stored in the capacitors Ct1 to Ct4 of the readout circuits R1 to Rn, the pulses φ1 to φn from the horizontal scanning circuit SH are sequentially output to the readout circuits R1 to Rn, so that an R- and G-dot sequential signal OUT1 and a G- and B-dot sequential signal OUT2 which are free from unnecessary components are output from the differential amplifiers 805 and 806, respectively. It should be noted that the signal OUT1 is a G- and B-dot sequential signal and the signal OUT2 is an R- and G-dot sequential signal in the next field.

Figure 17:
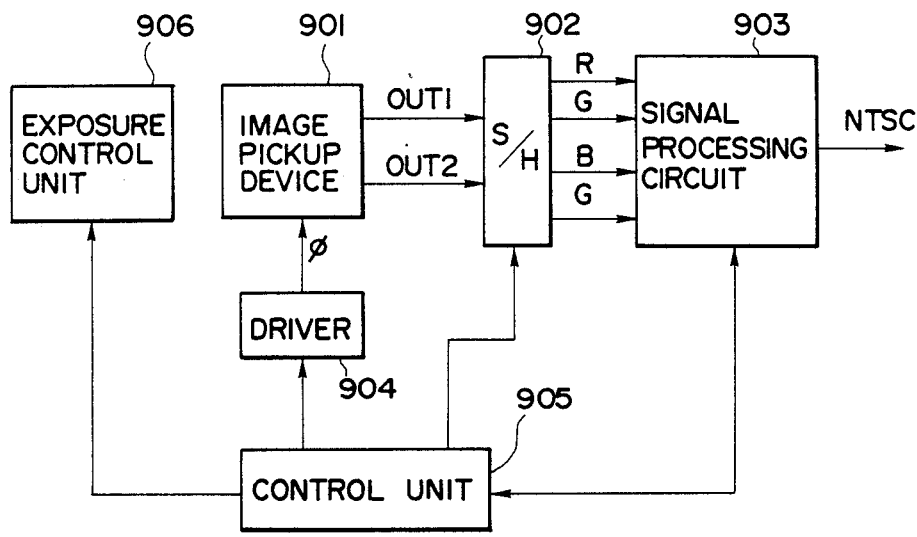
FIG. 17 is a block diagram showing an image pickup system using the apparatus (FIG. 10) as an image pickup device.

FIG. 17 is a schematic block diagram of an image pickup system using the solid state image pickup apparatus as an image pickup device.

An image pickup device 901 comprises an image pickup apparatus shown in FIGS. 14 and 15. The output signals OUT1 and OUT2 from the image pickup device 901 are processed by an image processing circuit 903 through a sample/hold (S/H) circuit 902 to produce a standard television signal such as an NTSC signal.

Pulses for driving the image pickup device 901 are supplied from a driver 904. The driver 904 is controlled by a control unit 905. The control unit 905 also controls an exposure control unit 906 to determine an intensity of light incident on the image pickup device 501.

According to the image pickup apparatus according to the third embodiment of the present invention, as described above, the residual signal is subtracted from the read signal of the photoelectric transducer cell upon its refreshing to remove the unnecessary components (e.g., a dark signal and drive noise) of the photoelectric transducer element, thereby obtaining a video signal having a high S/N ratio. As a result, a low-cost, compact image pickup apparatus can be manufactured.

Figure 18:
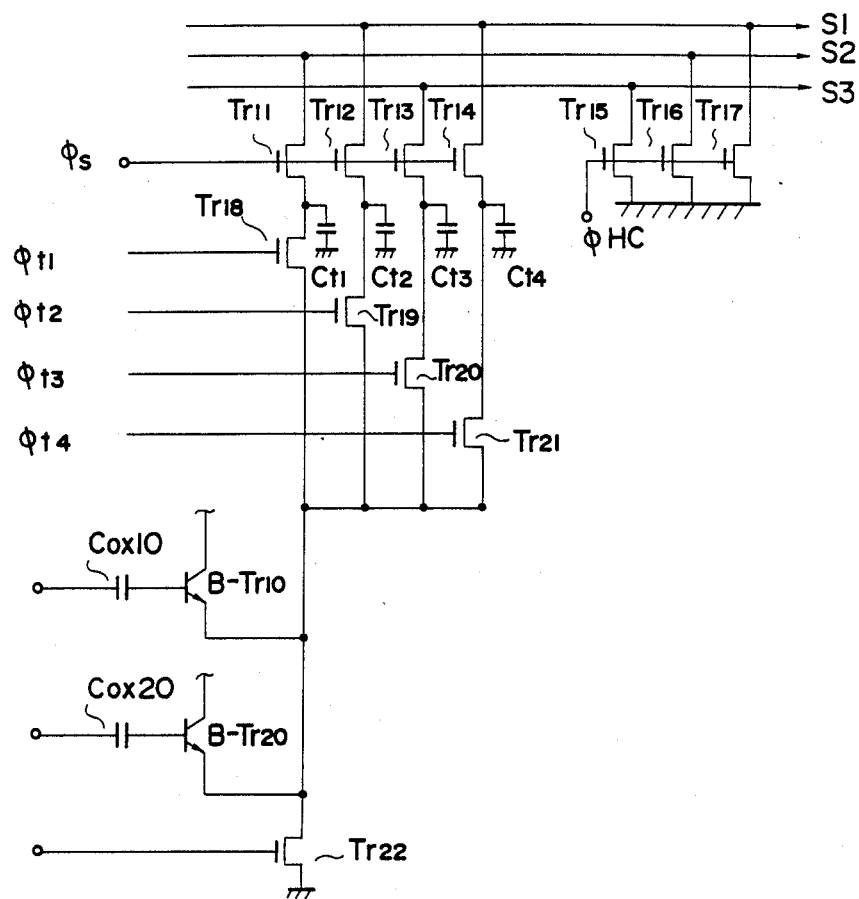
FIG. 18 is a circuit diagram showing an image pickup apparatus according to still another embodiment of the present invention.

FIG. 18 is a schematic view of an area sensor for simultaneously reading out signals of two horizontal lines. This circuit includes switching transistors Tr11 to Tr22, bipolar transistors B-Tr10 and B-Tr20, and capacitors Cox10 and Cox20. In this sensor, a photoelectric transducer signal and drive noise of the bipolar transistor B-Tr10 are respectively stored in the capacitors Ct1 and Ct2. A photoelectric transducer signal and drive noise of the bipolar transistor B-Tr20 are respectively stored in the capacitors Ct3 and Ct4. When these signals are to be read out, the photoelectric transducer signals are simultaneously and independently read out onto horizontal signal lines S2 and S3, and drive noise components are simultaneously output onto the horizontal signal line S1. Therefore, the drive noise components are output as a sum signal. R and G filters in an order of R, G, R, G, . . . are formed on photoelectric transducer elements of the even-numbered rows, and G and B filters in an order of G, B, G, B, . . . are arranged on photoelectric transducer elements of the odd-numbered rows.

Figure 19:
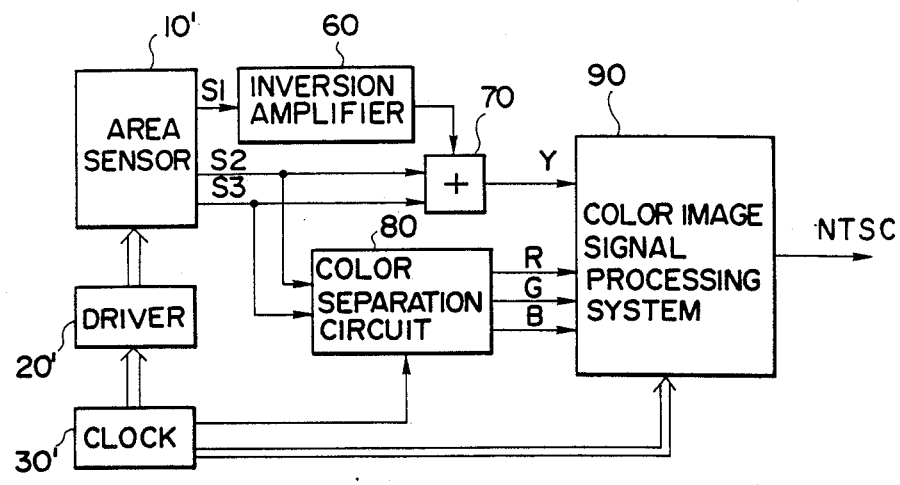
FIG. 19 is a block diagram showing an image pickup system using the image pickup apparatus (FIG. 18) as an area sensor.

FIG. 19 shows an image pickup system using the area sensor shown in FIG. 18.

The image pickup system includes an inversion amplifier 60, an adder 70, a color separation circuit 80, a color image signal processing system 90, an area sensor 10', a driver 20', and a clock generator 30'.

Photoelectric transducer signals S2 and S3 read out from the area sensor 10' are input to the adder 70 and are averaged, thereby obtaining a signal in the form of R+2G+B. The drive noise is inverted by the inversion amplifier 60, and the inverted signal is input to the adder 70. The adder 70 subtracts the drive noise from the photoelectric transducer signal, thereby producing a luminance signal Y consisting of only an information signal.

The color separation circuit 80 receives the photoelectric transducer signals S1 and S2 and separates them into chrominance signals R, G, and B. The resultant signals Y, R, G, and B are processed by the color image signal processing system 90. The processing system 90 generates a standard television signal such as an NTSC signal.

In the above embodiment, the scheme for simultaneously reading out signals of two horizontal lines is used. However, the present invention is applicable to a scheme for simultaneously reading out signals of three horizontal signals.

The storage capacitors can be omitted if the image pickup apparatus includes a shutter.

A subtracter for removing the drive noise may be connected to the output terminal within the apparatus.

In the above embodiment, the drive noise can be output independently of the photoelectric transducer signal, so that an external large-capacity memory need not be arranged.

In the horizontal line readout scheme, since the noise components can be added and its sum can be output, the number of horizontal signal lines can be reduced. Therefore, a multi horizontal line readout scheme can be easily achieved.

Figure 20:
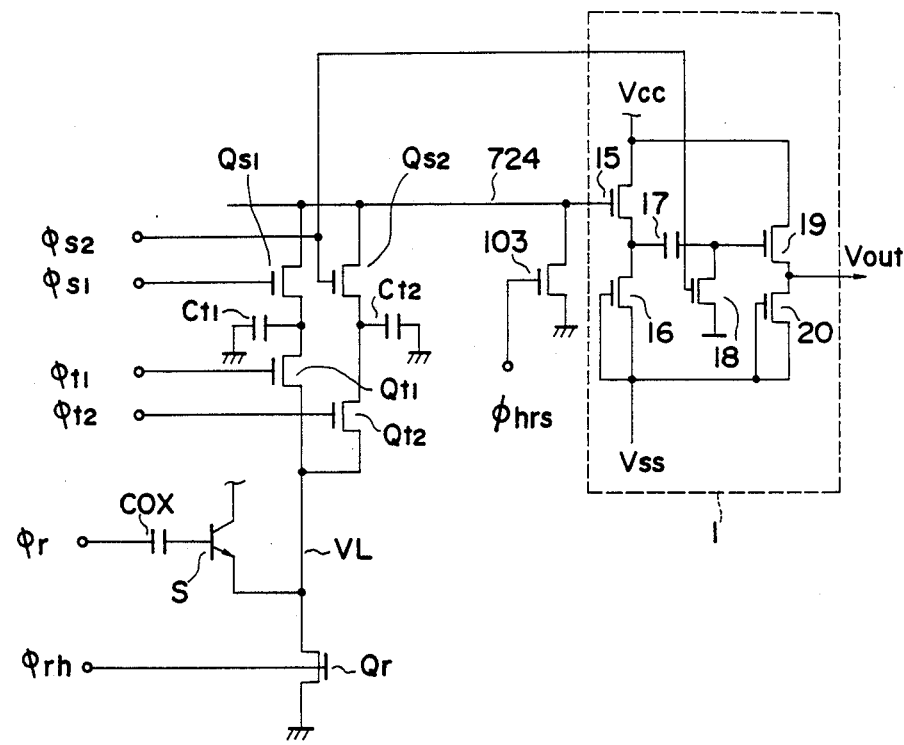
FIG. 20 is a circuit diagram of a solid state image pickup apparatus according to still another embodiment of the present invention.

FIG. 20 shows still another embodiment of the present invention. In this embodiment, the differential amplifier 723 in FIG. 10 is replaced with a clamp circuit. The same reference numerals as in FIGS. 1 to 19 denote the same parts in FIG. 20.

Figure 21:
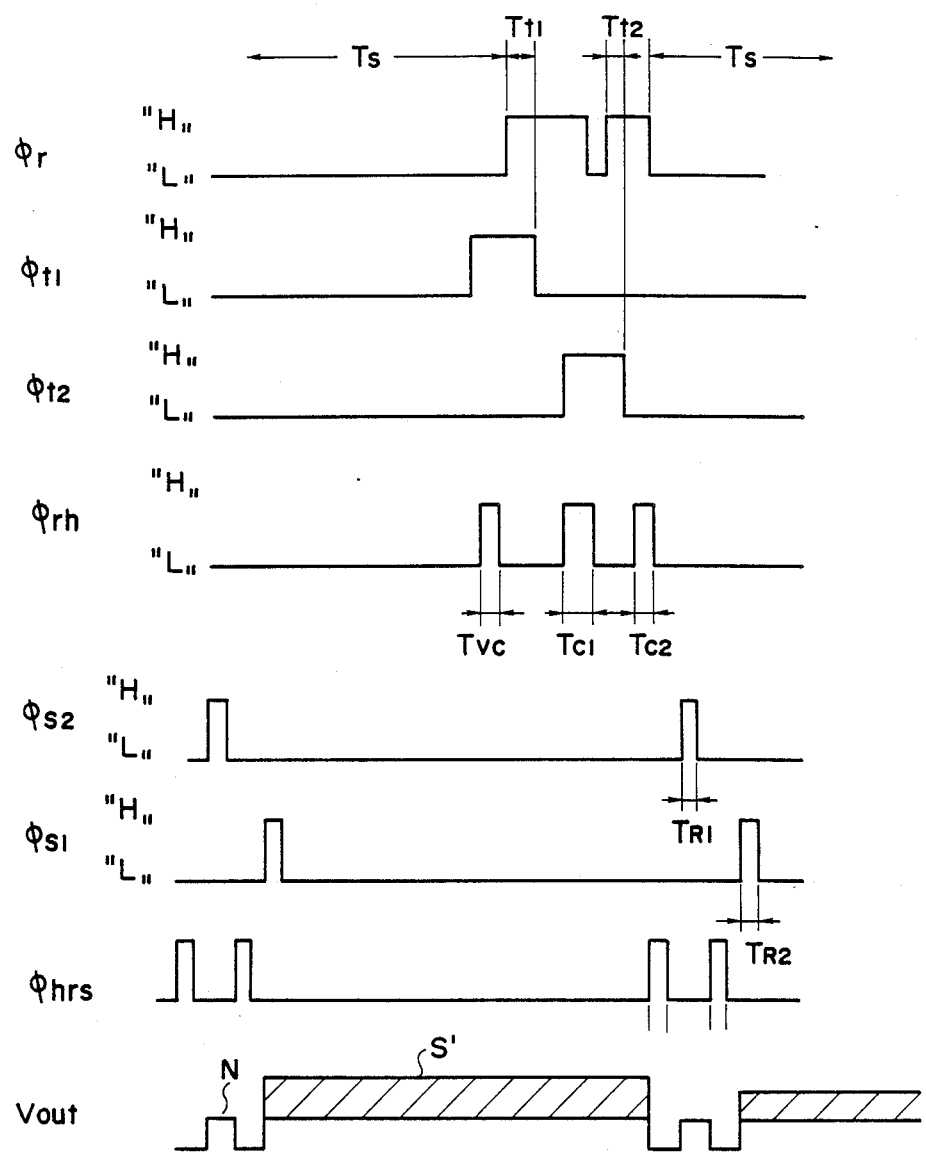
FIG. 21 is a timing chart for explaining the operation of the apparatus shown in FIG. 20.

FIG. 21 is a timing chart for explaining the operation of the circuit shown in FIG. 20.

Cells S are reverse-biased to perform charge accumulation during a time interval Ts. Upon completion of charge accumulation, the unnecessary charges on the vertical transfer lines VL and in the storage capacitors Ct1 are removed prior to transfer of photoelectric transducer signals within a time interval Tvc. The photoelectric transducer signal is transferred to a corresponding storage capacitor Ct1 during the time interval Ttl.

Refreshing is performed during a time interval Tc1, and drive noise is transferred to the storage capacitor Ct2 during a time interval Tt2. Thereafter, the cells S are refreshed during a time interval of Tc2, and the next charge accumulation cycle is initiated. The photoelectric transducer signals and the drive noise are independently obtained. The signals stored in the storage capacitors Ct1 and Ct2 are dot-sequentially transferred on a single signal line S in response to drive pulses $\phi s1$ and $\phi s2$. This operation occurs during time intervals TR1 and TR2 A drive pulse $\phi hrs$ is used to reset the signal line to the reference potential. The signal obtained by the above-mentioned read operation represents a waveform of an output Vout. The drive noise and the photoelectric transducer signal are represented by W and S', respectively.

The dot sequential signal S is input to a clamp circuit 1, and only the drive noise N is clamped in accordance with a drive pulse $\phi s2$. As a result, the drive noise N is eliminated, and a true information signal indicated by a hatched portion in FIG. 21 can be obtained.

Figure 22:
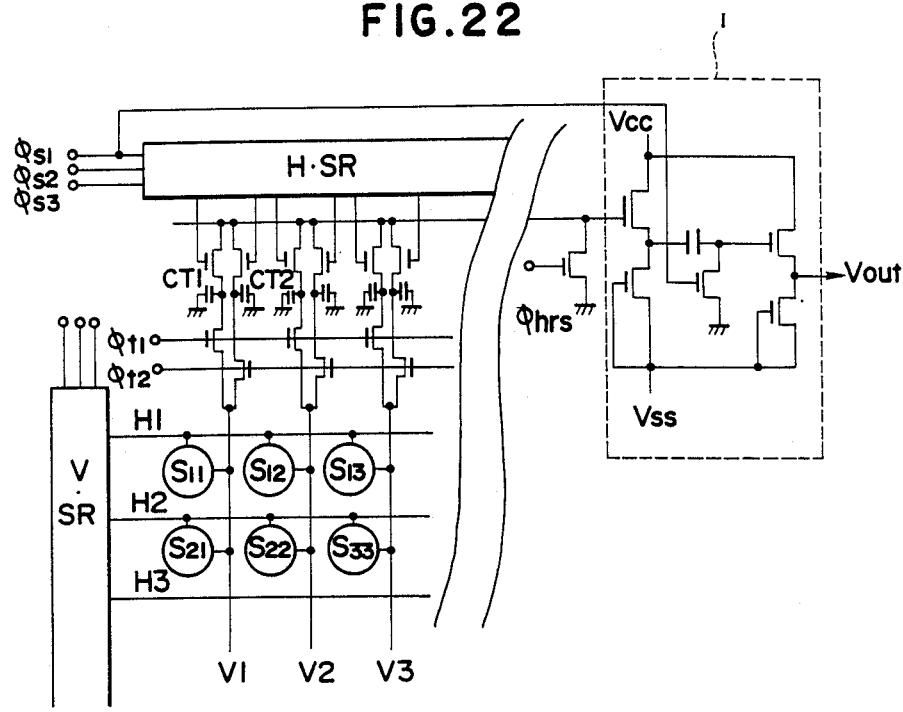
FIG. 22 is a schematic view showing an arrangement when the apparatus in FIG. 20 is applied to an area sensor.

FIG. 22 is a schematic circuit diagram of an area sensor constituted by the photoelectric transducer elements shown in FIG. 20. Referring to FIG. 22, the area sensor includes a vertical shift register V.SR, a horizontal shift register H.SR, and Smn, base accumulation type transistors arranged in an m×n matrix. The operation of the area sensor is basically the same as that of the photoelectric transducer element shown in FIG. 20, except that the area sensor performs horizontal scanning and vertical scanning, and a detailed description thereof will be omitted. Clamping of the read signal, which is the characteristic feature of this embodiment shown in FIG. 22, will be described in detail.

Figure 23:
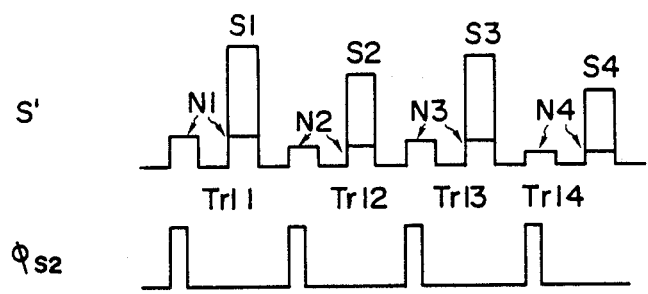
FIG. 23 is a timing chart for explaining the operation of the area sensor shown in FIG. 22.

A schematic waveform of the read signal is shown in FIG. 23. A signal S' appears on a read signal line S, and a pulse $\phi s2$ is a drive pulse. Referring to FIG. 23, drive noise and the photoelectric signal of a cell S11 correspond to N1 and S1, respectively. A cell S12 outputs signals N2 and S2, a cell S13 outputs signals N3 and S3, a cell S14 outputs signals N4 and S4, . . . . The drive noise component of the dot sequential signal is clamped in response to the drive pulse $\phi s2$. As a result, the drive noise is removed, and only the true information signal can be obtained.

The above embodiment exemplifies a scheme for reading out a signal of one horizontal line. However, this embodiment may be applied to a scheme for reading out a signal of one horizontal line in a time-divisional manner or a scheme for simultaneously reading signals of a plurality of horizontal lines, as shown in FIG. 14.

The base accumulation type transistor is exemplified as the photoelectric transducer element. However, a MOS or SIT image pickup device may be used as the photoelectric transducer element.

In the above embodiment, the drive noise and the photoelectric tansducer signal are converted into a dot sequential signal, and clamping can be easily performed, thereby easily removing the drive noise.

What is claimed is:

1. An image pickup apparatus including:
   (a) a photoelectric transducer element for converting incident light into a photoelectrical signal;
   (b) amplifying means for amplifying said photoelectric signal from said photoelectric transducer element; and
   (c) operating means having a first mode for causing said amplifying means to amplify the photoelectrical signal from said phtoelectrical transducer element to form a first signal, and a second mode for causing said amplifying means to amplify a signal which is left in said photoelectric element after refreshing said photoelectrical transducer to form a second signal, and for processing said first and second signals to form a third signal in order to remove noise, said first and second signals being obtained from the same photoelectric transducer element.

2. An apparatus according to claim 1, wherein said photoelectric transducer element includes a transistor.

3. An apparatus according to claim 1, wherein said operating means includes a differential amplifier.

4. An apparatus according to claim 1, wherein said operating means includes a clamp circuit.

5. An apparatus according to claim 1, wherein said operating means comprises holding means for holding at least one of the first and second signals.

6. An apparatus according to claim 5, wherein said holding means includes a capacitor.

7. An apparatus according to claim 5, wherein said holding means includes a sample/hold circuit.

8. An image pickup apparatus including:
   (a) a plurality of photoelectric transducer elements for converting incident light into photoelectrical signals; and
   (b) operating means having a first mode for reading out a first signal corresponding to light incident on said photoelectric transducer elements, and a second mode for reading out a second signal which is left in said photoelectric transducer elements after refreshing said photoelectric transducer, said operating means being adapted to perform an arithmetic operation on the first and second signals read out in the first and second modes in order to remove noise, said first and second signals being obtained from the same photoelectric transducer element.

9. An apparatus according to claim 8, wherein each photoelectric transducer element includes a transistor.

10. An apparatus according to claim 8, wherein said operating means includes a differential amplifier.

11. An apparatus according to claim 8, wherein said operating means includes a clamp circuit.

12. An apparatus according to claim 8, wherein said operating means comprises holding means for holding at least one of the first and second signals.

13. An apparatus according to claim 12, wherein said holding means includes a capacitor.

14. An apparatus according to claim 12, wherein said holding means includes a sample/hold circuit.

15. An apparatus according to claim 8, wherein read access in the second mode is performed as soon as read access in the first mode is performed.

16. An image pickup apparatus including:
 (a) a plurality of photoelectric transducer elements for converting incident light into electrical signals;
 (b) photoelectric transducer element control means having a first mode for reading out a first signal corresponding to light incident on said photoelectric transducer elements and a second mode for reading out a second signal which is left in said photoelectric transducer elements after refreshing said photoelectric transducer;
 (c) storage means for independently storing the first and second signals; and
 (d) operating means for processing the first and second signals stored in said storage means in order to remove noise, corresponding first and second signals being obtained from the same photoelectric transducer element.

17. An apparatus according to claim 16, wherein said storage means includes a capacitor.

18. An apparatus according to claim 16, wherein each photoelectric transducer element includes a transistor.

19. An apparatus according to claim 16, wherein said operating means includes a differential amplifier.

20. An apparatus according to claim 16, wherein said operating means includes a clamp circuit.

21. An apparatus according to claim 16, wherein read access in the second mode is performed as soon as read access in the first mode is performed.

22. An apparatus according to claim 16, wherein said plurality of photoelectric transducer elements are arranged in a matrix form, and said photoelectric transducer element control means scans said plurality of photoelectric transducer elements in row and column directions.

23. An apparatus according to claim 22, wherein said photoelectric element control means simulteneously reads out the electrical signals of photoelectric transducer elements of a plurality of rows in each scanning cycle in the row direction.

24. An apparatus according to claim 23, wherein said photoelectric transducer element control means has a blanking period between the scanning cycles in the row direction.

25. An apparatus according to claim 24, wherein said storage means store the first and second signals of each photoelectric element of the plurality of rows within the blanking period.

26. An apparatus according to claim 25, further comprising signal lines for respectively reading out the signals stored in said storage means.

27. An apparatus according to claim 26, wherein said signal lines for the second signal are commonly connected.

* * * * *

UNITED STATES PATENT AND TRADEMARK OFFICE
CERTIFICATE OF CORRECTION

PATENT NO. : 4,914,519

DATED : April 3, 1990

INVENTOR(S) : Hashimoto et al.

It is certified that error appears in the above-identified patent and that said Letters Patent is hereby corrected as shown below:

<u>IN THE DRAWINGS</u>

<u>SHEET 11</u>

In Fig. 12, "SCANNIG" should read --SCANNING--.

<u>SHEET 12</u>

In Fig. 13A, "UNNECCESSARY" should read --UNNECESSARY--.

<u>COLUMN 1</u>

Line 7, "solid state" should read --solid-state--.
    Line 9, "solid state" should read --solid-state--.

<u>COLUMN 2</u>

Line 49, "anc" should read --and--.

<u>COLUMN 3</u>

Line 35, "solid" should read --solid- --.

UNITED STATES PATENT AND TRADEMARK OFFICE
CERTIFICATE OF CORRECTION

PATENT NO. : 4,914,519

DATED : April 3, 1990

INVENTOR(S) : Hashimoto et al.

Page 2 of 4

It is certified that error appears in the above-identified patent and that said Letters Patent is hereby corrected as shown below:

COLUMN 4

Line 14, "solid state" should read --solid-state--.
    Line 42, "solid state" should read --solid-state--.

COLUMN 5

Line 4, "solid state" should read --solid-state--.
    Line 6, "solid state" should read --solid-state--.
    Line 11, "solid state" should read --solid-state--.
    Line 24, "solid state" should read --solid-state--.
    Line 40, "solid state" should read --solid-state--.
    Line 50, "solid state" should read --solid-state--.
    Line 66, "solid state" should read --solid-state--.

COLUMN 6

Line 14, "solid state" should read --solid-state--.

COLUMN 8

Line 40, "solid state" should read --solid-state--.

UNITED STATES PATENT AND TRADEMARK OFFICE
CERTIFICATE OF CORRECTION

PATENT NO. : 4,914,519

DATED : April 3, 1990

INVENTOR(S) : Hashimoto et al.

It is certified that error appears in the above-identified patent and that said Letters Patent is hereby corrected as shown below:

COLUMN 9

Line 19, "crcuit" should read --circuit--.
    Line 28, "grounded At" should read --grounded.  At--.

COLUMN 10

Line 1, "then held" should read --then is held--.
    Line 24, "differenc" should read --difference--.
    Line 61, "solid state" should read --solid-state--.

COLUMN 15

Line 31, "C1earing" should read --Clearing--.
    Line 67, "solid state" should read --solid-state--.

COLUMN 17

Line 12, "multi horizontal" should read --multihorizontal--.
    Line 39, "TR2 A" should read --TR2.  A--.
    Line 53, "V.SR" should read --V SR--.
    Line 54, "H.SR" should read --H SR--.
    Line 60, "C1amping" should read --Clamping--.

UNITED STATES PATENT AND TRADEMARK OFFICE
CERTIFICATE OF CORRECTION

PATENT NO. : 4,914,519

DATED : April 3, 1990

INVENTOR(S) : Hashimoto et al.

It is certified that error appears in the above-identified patent and that said Letters Patent is hereby corrected as shown below:

COLUMN 18

Line 17, "tansducer" should read --transducer--.

COLUMN 20

Line 17, "simulteneously" should read --simultaneously--.

Signed and Sealed this

Twenty-ninth Day of March, 1994

*Attest:*

BRUCE LEHMAN

*Attesting Officer*    Commissioner of Patents and Trademarks